United States Patent [19]
Conrad et al.

[11] Patent Number: 6,133,918
[45] Date of Patent: Oct. 17, 2000

[54] COMPUTER SYSTEM WITH GRAPHICAL USER INTERFACE INCLUDING DRAWER-LIKE WINDOWS

[75] Inventors: Thomas J. Conrad, San Jose; Elizabeth Ann Robinson Moller, Boulder Creek, both of Calif.

[73] Assignee: Apple Computer, Inc., Cupertino, Calif.

[21] Appl. No.: 09/135,987

[22] Filed: Aug. 17, 1998

Related U.S. Application Data

[63] Continuation of application No. 08/075,278, Jun. 11, 1993, Pat. No. 5,956,030.

[51] Int. Cl.$^7$ .............................. G06F 13/00; G06F 3/00
[52] U.S. Cl. ............................................ 345/342; 345/346
[58] Field of Search ..................................... 345/326, 339, 345/340, 341, 342, 343, 344, 345, 346, 347, 348, 349, 351

[56] References Cited

U.S. PATENT DOCUMENTS

| | | | |
|---|---|---|---|
| Re. 32,632 | 3/1988 | Atkinson | 345/165 |
| 4,688,167 | 8/1987 | Agarwal | 345/113 |

(List continued on next page.)

FOREIGN PATENT DOCUMENTS

| | | | |
|---|---|---|---|
| 0 483 777 A3 | 5/1992 | European Pat. Off. | G06F 3/033 |
| 2 693 810 A1 | 1/1994 | France | G06F 3/14 |

OTHER PUBLICATIONS

IBM Technical Disclosure Bulletin, vol. 35, No. 4B, Sep. 1992, pp. 331–332.

IBM Technical Disclosure Bulletin, vol. 35, No. 7, Dec. 1992, p. 207.

R. Mander, et al., "A 'Pie' Metaphor for Supporting Casual Organization of Information", CHI 1992, pp. 627–634.

B. Myers, "Window Interfaces A Taxonomy of Window Manager User Interfaces", IEEE Computer Graphics & Applications, Sep. 1988, pp. 65–84.

(List continued on next page.)

*Primary Examiner*—Ulka J. Chauhan
*Attorney, Agent, or Firm*—Blakely, Sokoloff, Taylor & Zafman

[57] ABSTRACT

A window management mechanism allows a user to open a window as a drawer or, perhaps more appropriately named, a pop-up window. The drawer is an opened window that a user has dragged down to a drawer region at the bottom of the screen such that only the title bar or some drawer handle illustration is left showing. When the user does this, the window remains open but is kept offscreen. The user may momentarily pop the window back onto the screen by clicking on the window title bar or drawer handle, or by dragging the cursor into the window icon during a drag. The window stays onscreen as long as no other windows are selected. As soon as a user selects another window, or opens a file with a double click within the drawer, the window slides back offscreen. This allows the user to set up easy access windows. Another feature of a drawer window allows the user to open them during a drag. To do so, the user drags an object or the cursor into the drawer window that is desired to be opened. When the cursor touches the bottom of the screen, or an area within a threshold of the bottom of the screen, the drawer window slides open a notch at a time. As long as the user pushes against the bottom or remains in this threshold region, the drawer slides open.

21 Claims, 19 Drawing Sheets

U.S. PATENT DOCUMENTS

| | | | |
|---|---|---|---|
| 4,689,737 | 8/1987 | Grant | 704/8 |
| 5,008,853 | 4/1991 | Bly et al. | 345/118 |
| 5,040,131 | 8/1991 | Torres | 345/348 |
| 5,305,435 | 4/1994 | Bronson | 345/351 |
| 5,347,628 | 9/1994 | Brewer et al. | 345/351 |
| 5,371,844 | 12/1994 | Andrew et al. | 345/334 |
| 5,384,911 | 1/1995 | Bloomfield | 345/333 |
| 5,412,776 | 5/1995 | Bloomfield et al. | 345/346 |
| 5,422,993 | 6/1995 | Fleming | 345/348 |
| 5,579,469 | 11/1996 | Pike | 345/326 |
| 5,583,984 | 12/1996 | Conrad et al. | 345/340 |
| 5,714,971 | 2/1998 | Shalit et al. | 345/340 |
| 5,737,737 | 4/1998 | Hikida et al. | 707/104 |
| 5,745,096 | 4/1998 | Ludolph et al. | 345/340 |
| 5,754,174 | 5/1998 | Carpenter et al. | 345/334 |
| 5,767,834 | 6/1998 | Vouri et al. | 345/132 |
| 5,825,348 | 10/1998 | Ludolph et al. | 345/115 |

OTHER PUBLICATIONS

Apple Computer, "Inside MacIntosh", 1992 Addison–Wesley, Ch. 6, pp. 107–130.

J. Johnson, et al., "The Xerox Star: A Retrospective", Computer (Sep. 1989), vol. 22 No. 9, pp. 11–28.

Brad A. Myers, "Window Interfaces—A Taxonomy of Window Manager User Interfaces", IEEE Computer Graphics and Applications (Sep. 1988), vol. 8, No. 5, pp. 65–84.

IBM Technical Disclosure Statement, "Automatic Window Management Mode" (Sep. 1992), vol. 35, No. 4B, pp. 331–332.

Screen Dumps From Microsoft Windows v3.1™, Microsoft Corporation, 1985–1992, pp. 1–6.

Screen Dumps from Microsoft Windows, pp. 1–10.

Richard Mander, et al., "A 'Pile' Metaphor for Supporting Casual Organization of Information", CHI 1992, Mar. 5, 1992, pp. 627–634.

"*Microsoft Windows*™ *User Guide*", Microsoft Corporation, Version 3.0, p. 97.

"*Notebook Tabs as Target Location for Drag/Drop Operations*", IBM Technical Disclosure Bulletin, vol. 35, No. 7, Dec. 1992, p. 207.

FINISH DRAG

COMPUTER SYSTEM WITH GRAPHICAL USER INTERFACE INCLUDING DRAWER-LIKE WINDOWS

The application is a continuation application of Ser. No. 08/075,278, filed Jun. 11, 1993, now U.S. Pat. No. 5,956,030.

BACKGROUND OF THE INVENTION

1. Field of the Invention

The present invention relates to computer systems with graphical user interfaces, such as window based systems; and more particularly to techniques for providing access to a plurality of open windows on the screen at one time.

2. Description of the Related Art

Graphical user interfaces on computer systems are gaining widespread use. Typical systems include the Macintosh Finder™ environment in Macintosh computers provided by Apple Computer, Inc., of Cupertino, Calif., the Windows environment provided by Microsoft Corporation of Redmond, Wash., and the New Wave™ environment provided by Hewlett-Packard of Palo Alto, Calif. In such systems, a workspace on the display system is set up with a desktop metaphor. Within the desktop, there are a number of icons displayed which correspond to objects stored in memory. The objects include, for instance, files, applications programs, control panels, and enclosures that enclose other objects. Opening an icon results in display of a window within the desktop corresponding to the underlying object. Thus, opening an application window, such as a word processor, results in display of a document into which text may be entered using the word processing program. Opening of a control panel icon results in opening of a control panel window by which the user controls system parameters. Opening of an enclosure icon, such as a folder in the Macintosh Finder™ environment, results in opening of a window that encloses other icons.

When the user opens a plurality of windows on the desktop, it can become cluttered. Also, important windows to which the user may need ready reference, may become obscured behind a number of other windows needed for a given working environment and difficult to recall without messing up the working environment. For instance, if the user has an electronic mail window open on the desktop, but obscured behind a word processor window, a spread sheet window and an enclosure window, access to the electronic mail window becomes cumbersome. If a user, while working, desires to send a mail message, he must first clear the large windows from the screen in order to find the electronic mail window. After the electronic mail window is found, it must be moved to the top window. Once it is a top window, it can be used as needed. However, this procedure shuffles the desktop so that it is no longer in a convenient environment for use. Thus, when the user closes the electronic mail window, he or she must then clean up the desktop to return to the original working arrangement.

One approach to solving this problem is described in U.S. patent application entitled DESK DRAWER USER INTERFACE, invented by Ludolph, et al., filed Jun. 3, 1991, Ser. No. 08/780,626. The Ludolph, et al., application was owned at the time of invention and is currently owned by the same Assignee as the present application. According to the Ludolph, et al., invention, additional desktop space is provided using a desk drawer metaphor which can be slid onto and off of the screen. The user could place icons that correspond to often used applications or enclosures, into the desk drawer region of the desktop. When access is needed to the objects in the desk drawer, the extended desktop is slid open using a cursor action, and the object is selected by the user on the extended desktop. Windows cannot be placed in the extended desktop. This approach to overcoming the clutter of a desktop with a large number of windows has achieved some success by expanding the desktop area. However, the desktop remains subject to clutter.

It is desirable to provide quick and convenient access to windows in a friendly, flexible, and customizable way in a graphic user interface environment. Further, it is desirable to provide easy access to such windows during the middle of a drag operation.

SUMMARY OF THE INVENTION

The present invention provides a window mechanism by which a user may open a window as a drawer or, perhaps more appropriately named, a pop-up window. The drawer is a window that a user has dragged down to a drawer region at the bottom of the screen such that only the title bar, or some other drawer identifier, is left showing. When the user does this, the window remains open from the point of view of the operating system, but is kept offscreen. The user may momentarily pop the window back into the window region by clicking on the window title bar or drawer identifier. As soon as the user opens a file in the drawer via a double click, clicks on the drawer identifier, or selects some other window by clicking outside the drawer on another window, the drawer window slides back offscreen leaving its identifier showing in the drawer region. The user can also open a drawer by dragging the cursor into the drawer region during a drag. During a drag, the drawer stays popped open as long as the cursor stays inside the content area of the drawer. This allows the user to set up easy access windows that do not clutter the working environment. For instance, server aliases may be placed in a drawer window, control panels may be placed in a drawer window, applications programs like electronic mail may be suitable for a drawer window, etc. Another possible use is to put an alias to the hard disk or disks in the system and a trash icon in the drawer window so that they may be easily accessed.

Another feature of drawer windows allows the user to open them during a drag. To do so, the user drags an object or the cursor into the drawer region for the window that is desired to be moved onscreen. When the cursor touches the region, or an area within a threshold of the bottom of the screen, the drawer window slides onto the screen a notch at a time. As long as the user "pushes" against the bottom or remains in this threshold region, the drawer slides onto the screen. If the user lets off of the bottom of the screen, the window stops unrolling until the user pushes some more. This allows the user to move a drawer onscreen just as much as needed for a given operation. Mousing or moving the cursor out of the drawer during the drag operation will close the drawer.

This provides a browse operation very similar to the manner in which pull down menus are browsed in the current Macintosh Finders environment. For example, the user may drag a program into a utility drawer and let it scroll until the ResEdit icon comes onto the screen. Then, the program may be dropped into the icon to launch ResEdit. The drawer snaps shut and the ResEdit window opens with the program displayed for editing.

Thus, the present invention can be characterized as an apparatus for organizing a graphic workspace on a computer system. The computer system includes control software for displaying a graphic workspace, including a window region and a control region, termed herein drawer region, on the display. A plurality of objects are stored in a storage system within the computer memory. The objects comprise processing units which may occupy a window on the display when opened. Window management logic manages a plurality of windows within the window region on the graphic workspace on the display corresponding to opened objects. The plurality of windows includes windows which may overlap and obscure other windows in the plurality. A second window management logic termed herein drawer management logic is included which provides a drawer region near the perimeter of the workspace with an identifier corresponding to a particular opened window, and responsive to user input indicating selection of the identifier within the drawer region for moving the particular opened window into view in the window region. Further, logic is provided for removing the particular window from the window region in response to gestures of the cursor, such as moving the cursor out of the window or clicking on the title bar of the window.

The plurality of windows includes applications windows providing area within the workspace for applications programs, enclosure windows providing area within the workspace for displaying icons corresponding to related objects, tool palette windows for displaying buttons to select tools for given applications and control panel windows providing area within the workspace for system control functions. The particular window subject of drawer management may be an application window, a tool palette window, a control panel window, or an enclosure window.

The drawer management logic also includes a routine for graphically sliding the particular opened window into the window region of the workspace as if from outside the perimeter of the window region when moving the particular window onscreen. In addition, during a drag operation of a particular object over a drawer identifier, the drawer slides onscreen in cooperation with the drag operation into the workspace.

Further, the drawer management logic includes initiate logic that receives an indication of a drag operation of a window in the workspace. A drawer is initiated for the window subject of the drag operation, when the cursor is moved into the drawer region near or on the perimeter of the window region. Alternatively, a window may be viewed as a drawer using a standard menu selection on the graphic workspace.

In another aspect of the present invention, the drawer management system, as described above, is coupled with a spring loaded enclosure management system operable during drag operation for opening temporary windows for enclosure identifiers selected during the drag operation. The enclosure identifiers may exist in a window on the normal work area, or within a drawer window. The user may position the cursor during the drag over an object within the drawer, pause and cause a temporary window to open over the position of the cursor to browse for a destination of the drag operation. By mousing out of the temporary window, the temporary window will close again.

Accordingly, another way to view a regular window has been provided using a drawer or pop-up window motif. To create a drawer, the user either drags a window to the bottom of the screen, where it is positioned and turned into a drawer, or the user simply chooses a control signal from the pop-up menus in the graphical user environment.

Although the term "drawer" is used herein to refer to windows exhibiting the unique pop-up and slide into view behaviors described, the term is not intended to limit the invention to implementations based on a drawer metaphor that may involve sliding from the edge of the screen, or the like. Other pop-up or slide into view metaphors may apply as well.

The present invention provides great flexibility for applications programs to exchange information using the window structure based on desk drawers and spring open enclosures. Tasks that previously required many menu commands and mouse operations can now be completed with a single drag operation.

Other aspects and advantages of the present invention can be seen upon review of the figures, the detailed description, and the claims which follow.

DESCRIPTION OF THE PREFERRED EMBODIMENTS

Figure 1:
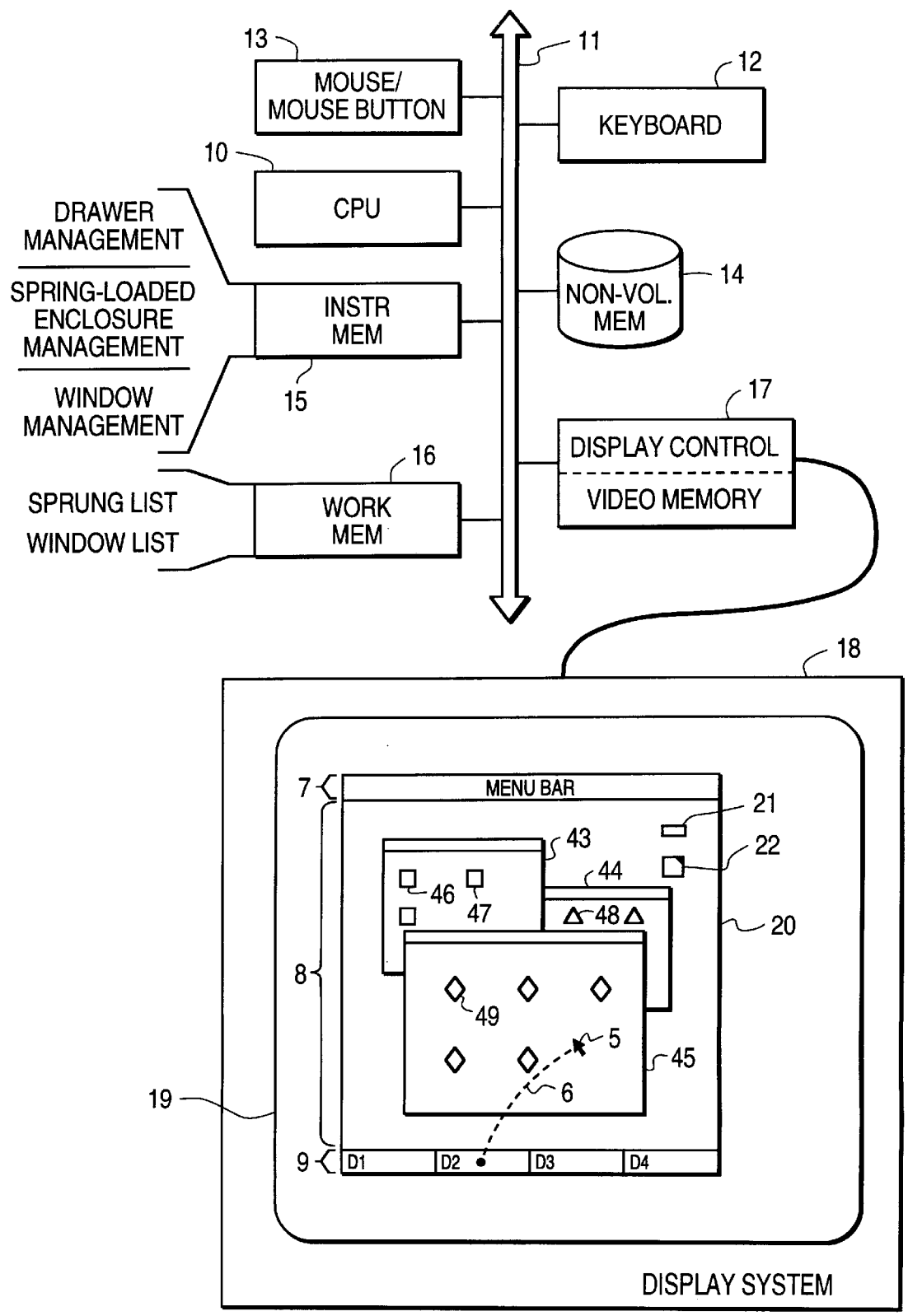
FIG. 1 is a schematic diagram of a computer system implementing the drawer window management system of the present invention.

A detailed description of a preferred embodiment of the present invention is provided with respect to the figures. FIG. 1 provides a system overview. FIGS. 2–5, 6A–6C, 7A–7C, 8A–8D, and 9A–9E illustrate the operation of the graphical user interface using drawer windows and spring loaded enclosures according to the present invention. FIGS. 10–20 illustrate an implementation of the control software for a system executing the present invention. FIGS. 21A–21B and 22A–22B illustrate alternative gestures for opening spring loaded enclosures.

I. System Overview (FIGS. 1–5. 6A–6C. 7A–7C. 8A–8D. and 9A–9E)

FIG. 1 illustrates a computer system implementing the drawer window and spring-loaded enclosure features of the present invention. The computer system includes a host CPU 10 coupled to a system bus 11. The system includes a keyboard 12, a mouse 13 including a mouse button, or other pointing device, and a non-volatile memory 14, such as a hard disk, floppy disk, non-volatile integrated circuit memory system, or the like. Similarly, instruction memory 15 and working memory 16 are coupled to the bus 11. The instruction memory 15 stores drawer management software, spring-loaded enclosure management software and window management software, among other software needed for operation of the system. The working memory 16 is used to maintain a list of sprung open enclosures, and a window list with indication of whether a window is a drawer, or other tables needed by the software in the instruction memory 15.

Finally, the system includes a display controller 17 which includes video memory. The display controller 17 drives a display 18 such as a CRT video monitor, LCD flat panel display, or the like. The display system 18 has a screen, generally 19. On the screen 19, a workspace 20 is displayed. The workspace 20 is implemented with a desktop metaphor in the Macintosh type systems with a menu bar region 7 for pop-down menus, and a window region 8 for displaying windows and icons. According to the present invention, the workspace further includes a drawer region 9 for displaying identifiers (graphical or textual) corresponding to drawer windows. Within the window region 8 of the desktop 20, a plurality of identifiers may be displayed, such as the identifier 21 representing a hard disk drive, the identifier 22 representing a floppy disk, and other identifiers not shown which represent files, applications, control panels, or enclosures which enclose other objects. Also in the window region of the desktop 20, a plurality of windows, such as windows 43, 44, and 45 may be opened. The windows 43, 44, and 45 enclose identifiers, such as identifiers 46 and 47 in window 43, identifier 48 in window 44, and identifier 49 in window 45.

Displayed along the bottom perimeter of the workspace 20 in the drawer region 9 are a plurality of drawer identifiers D1, D2, D3, and D4. These drawer identifiers may be formed with a title bar of the drawer window, a portion of the title bar, with a special drawer handle illustration or other identifier, as suits the needs of a particular implementation. The desktop 20 may be managed so that windows within the window region 8 do not obscure the drawer region 9, so that identifiers within the drawer region are always accessible for any environment set up within the window region. Alternatively, to allow as large a working area as possible for windows, the window region may include the drawer region, so that windows may cover drawer identifiers.

In a preferred system, the drawer identifiers are always on the bottom of the window stack, so they can get obscured. But the entire surface of the identifier is "hot" during a drag, so the user only needs leave one pixel showing in the drawer region at the bottom of the screen for the drawer to be accessible.

In the figure, the identifiers are shown as graphical elements, or icons. Alternative identifiers may be textual elements, such as the name of the corresponding object. The behaviors described herein may be applied to both textual and graphical elements, as may occur in windows opened in a view by name mode or a view by icon mode in Macintosh computers.

Figure 2:
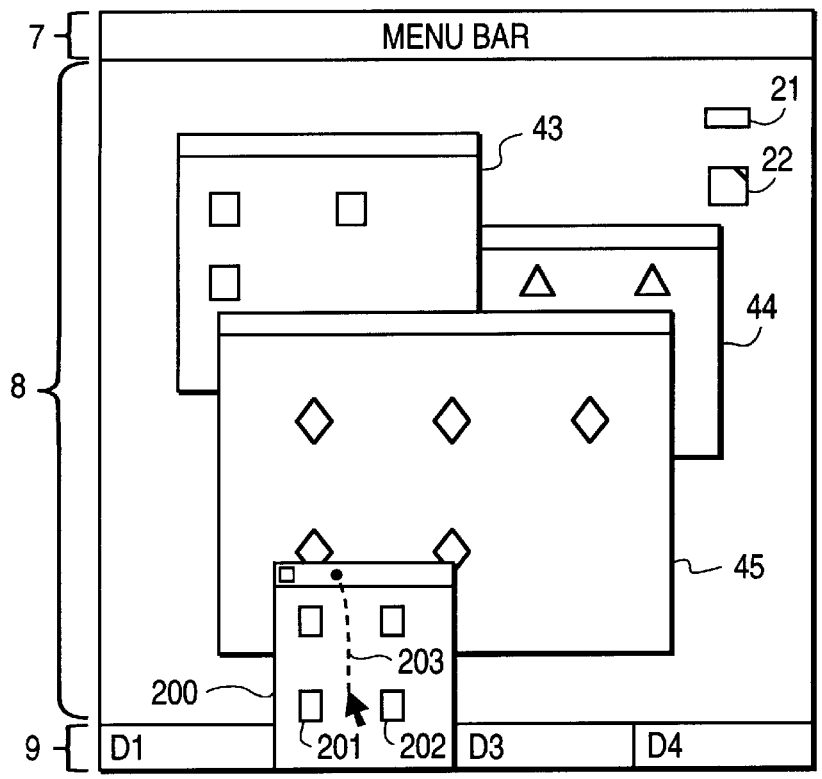
FIG. 2 illustrates a pop-up window or drawer in the window region according to the present invention.

Displayed within the desktop 20 is the cursor 5. The user moves the cursor along a path 5 to drawer identifier D2 and clicks. In response to a click, the drawer springs into the window region 8, as shown in FIG. 2 (to be explained in more detail below). If the user double clicks on an identifier within an open drawer, the drawer immediately snaps shut and the identifier is chosen, such as by opening a window corresponding to the object represented by the identifier or launching a corresponding program.

In the illustration of FIG. 1, the desktop 20 is somewhat smaller than the screen 19. Alternative systems may extend the desktop metaphor to the entire area of the screen 19.

The drawer management software, spring-loaded enclosure management software and window management software in the instruction memory 15 of the system are used to open and close windows, to move drawer windows on and offscreen, and to maintain records concerning the open and closed windows, including their positions within the desktop 20, the location of identifiers within the windows or on the desktop 20, whether the window is opened as a drawer and the like. During a drag operation, the spring-loaded enclosure management software in the instruction memory 15 is operable to create temporary windows so that the user may browse during the drag operation.

As mentioned above, FIG. 2 illustrates a window 200 which is popped onscreen in response to selection of the drawer identifier D2 in the operation shown in FIG. 1. After popping the window 200 onscreen, the enclosures of window 200 are displayed, such as identifiers 201, 202, etc. The user may then cause the window to be moved offscreen by moving the cursor along path 203 to the title bar and clicking the mouse button. A drawer shuts when an identifier inside the drawer is opened, or any time another window gets selected (via a click outside the drawer on another window or on the desktop, for example). During a drag, drawers close when the cursor moves outside of them. This behavior is the same as that of temporary windows described below.

Figure 3:
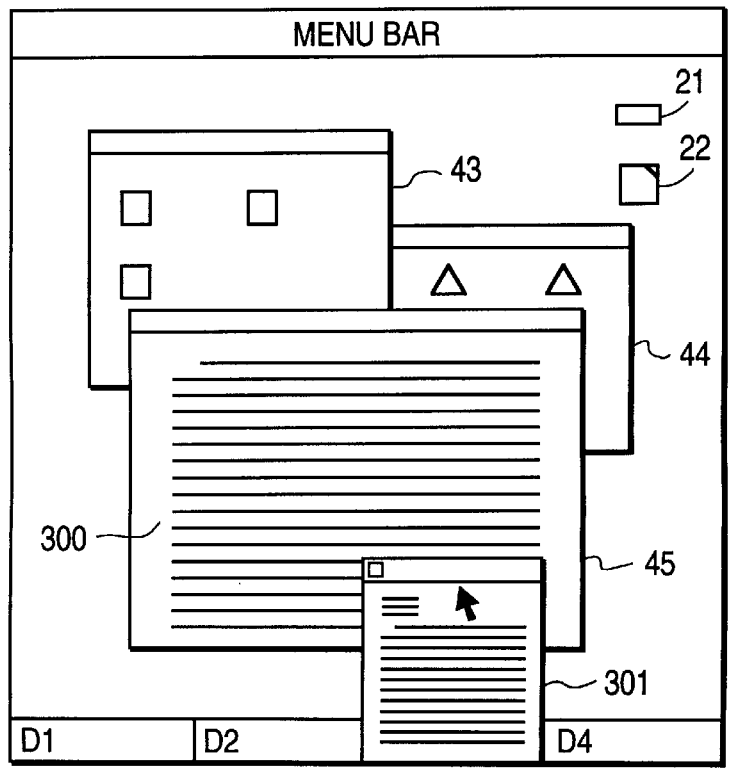
FIG. 3 illustrates an opened application window which has been moved onscreen as a drawer.

In the example of FIGS. 1 and 2, all of the windows are enclosure windows which display identifiers corresponding to objects enclosed by the enclosure. Other types of windows may exhibit the drawer behavior as illustrated in FIG. 3. For instance, in FIG. 3, the window 45 may be an applications window, such as a word processor displaying text 300. Drawer D3 may be a window 301 for a word processor application having its own set of text. The user may then use drag operations to move text between the documents as displayed in the windows 300 and 301. This technique might be used, for instance, if the text in window 301 is to be used often in a body of documents to be developed.

Figure 4:
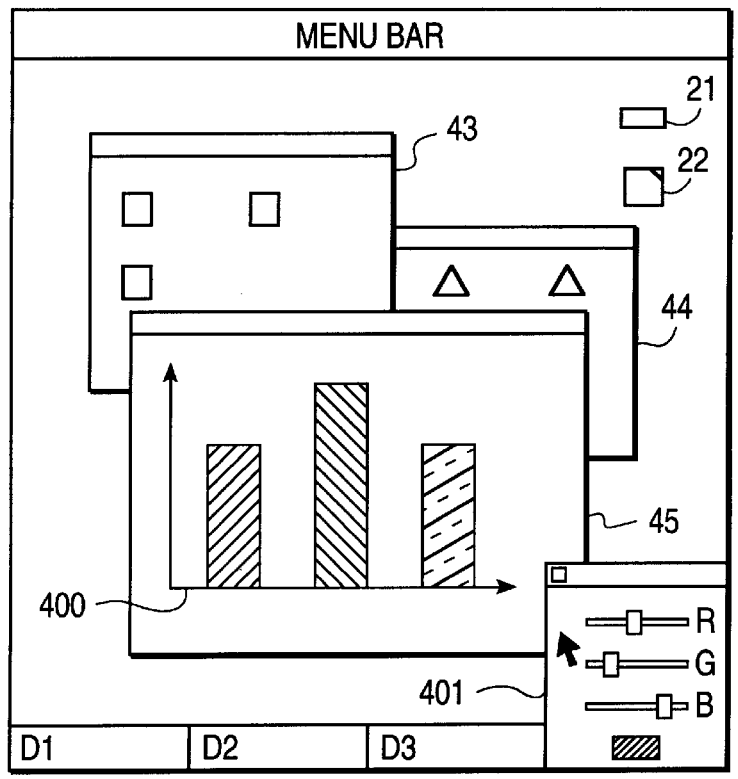
FIG. 4 illustrates an opened control panel window which has been moved onscreen as a drawer.

Another example for the use of the drawer windows is shown in FIG. 4. In this case, the window 45 is a chart drawing application, which the user is composing a chart 400. A control panel window 401 is viewed as a drawer D4. Using the control panel 401, the user may compose a color using the red, green, and blue sliders shown in the window.

Figure 5:
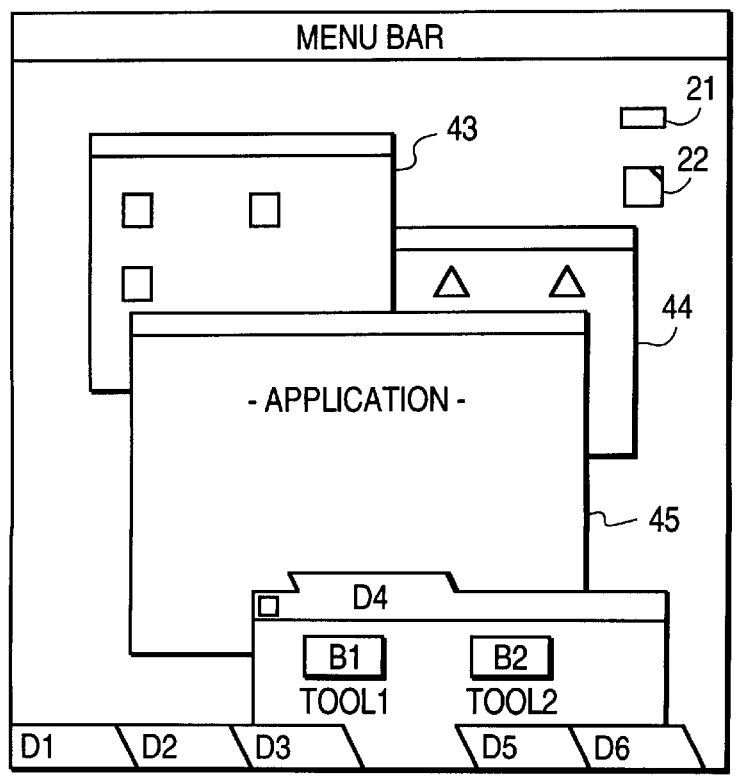
FIG. 5 illustrates an alternative drawer identifier icon arrangement according to the present invention.

In the examples of FIGS. 2–4, the pop-up drawers have the same width as the desk drawer identifiers D1–D4. FIG. 5 illustrates an alternative configuration in which there are six drawer identifiers D1–D6. The drawer D4 is shown partially onscreen, with a width substantially greater than the width of the drawer identifier icon. The drawer D4 in FIG. 5 also illustrates a tool palette window opened as a drawer, which includes buttons B1, B2 to select tools TOOL1, TOOL2, for the user of the application in window 45.

Also, in the examples provided here, the drawer windows are moved onscreen with drawer-like behavior from the bottom of the screen. An alternative system may move a drawer window onscreen at user specified or configured locations, like the location of the window before initiated as a drawer, or the default opening location for the window.

Figure 6A:
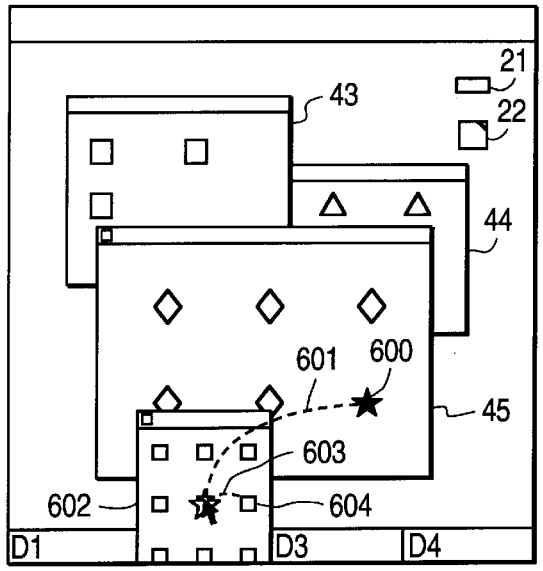
FIGS. 6A–6C illustrate operation of a drawer during a drag operation with a spring loaded enclosure.
Figure 6B:
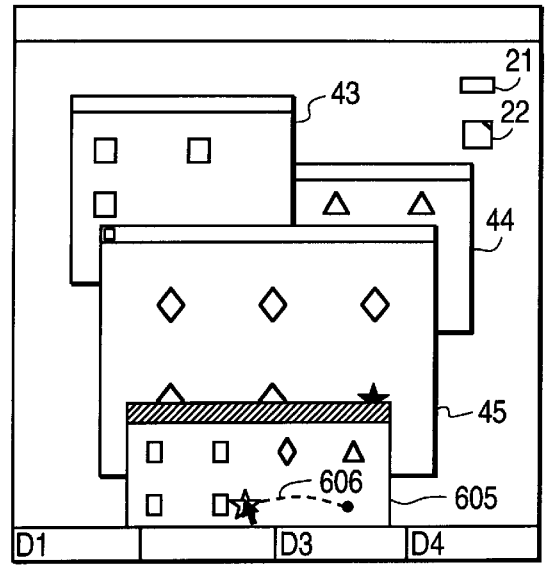
Figure 6C:
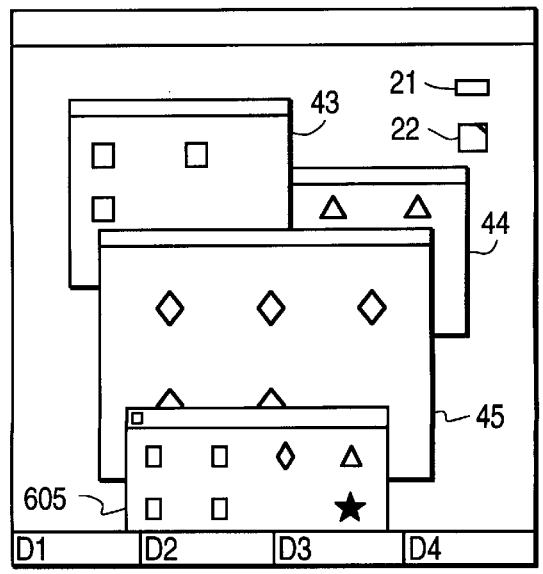

FIGS. 6A–6C illustrate operation of drawers during a drag operation. In this example, the user has executed a drag operation from object 600 along path 601 into the drawer 602. An outline of the object 600 is coupled with the cursor and used to slide the drawer 602 onscreen. The user then moves the cursor along path 603 over identifier 604. By pausing over identifier 604, a temporary window 605 is opened over the identifier as illustrated in FIG. 6B. The partially onscreen drawer window 602 is obscured by the temporary window 605. The user then may complete the drag operation along path 606 to place the object within the temporary window 605 as shown in FIG. 6C. When the drag operation is completed by placing the object within temporary window 605, the desk drawer D2 then snaps shut and its identifier is shown at the bottom of the screen. After a drag has ended, all of the temporary windows but the destination close. The destination window stays open until the user explicitly closes the window via an action such as a menu command or a click in the close box.

Figure 7A:
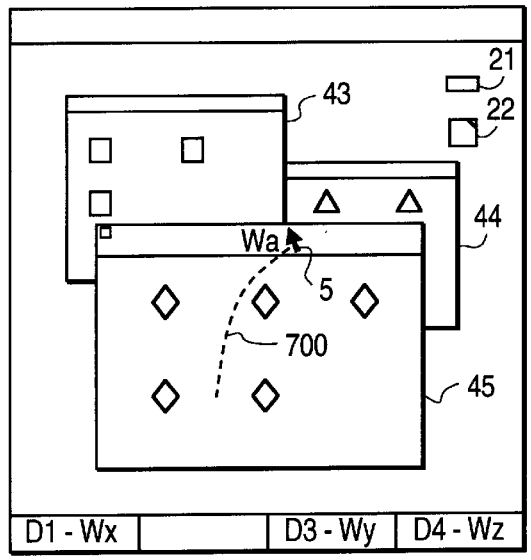
FIGS. 7A–7C illustrate a drag operation to convert an opened window into a drawer.
Figure 7B:
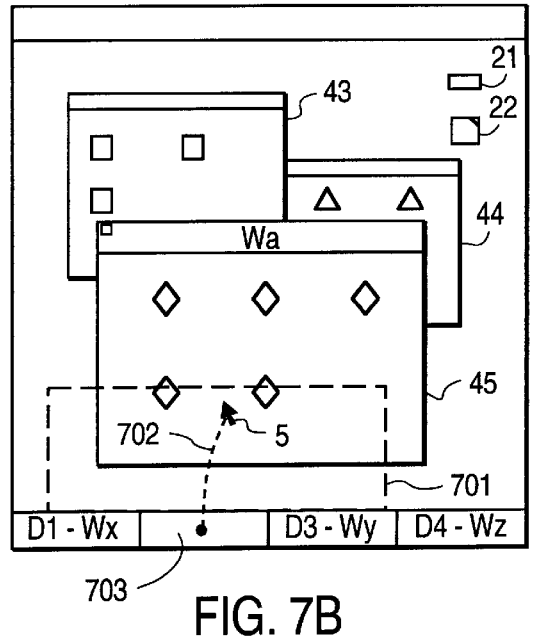
Figure 7C:
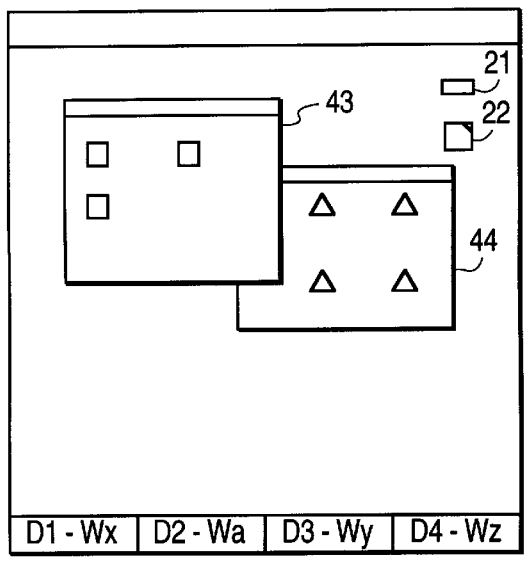

FIGS. 7A–7C illustrate a manner in which a window Wa is converted into a desk drawer D2. In the example of FIGS. 7A–7C, window 45 is titled Wa. Desk drawer D1 is filled with window Wx, desk drawer D3 is filled with window Wy, and desk drawer D4 is filled with window Wz. In order to convert window Wa into a desk drawer D2, the user positions the cursor over the title bar of window 45, depresses the mouse button, and drags the window along path 700. As shown in FIG. 7B, an outline 701 of window 45 is coupled with the cursor 5 during the drag operation. The drag operation continues along path 702 into the region 703 for the drawer identifier D2. At this point, the window Wa is converted into the drawer D2-Wa, as shown in FIG. 7C. Also, the window 45 is removed from the screen.

Alternatively, window Wa may be converted into a drawer, by choosing a command from a pop-down menu on the menu bar for the work area. The command automatically moves the front-most window to the bottom of the screen and turns it into a drawer.

Examples of the operation of the spring-loaded enclosures are provided with reference to FIGS. 8A–8D and 9A–9E. In these diagrams, the windows 23, 24, and 25 are used as a base for ease of understanding. The "star" identifier 30 in window 24 will be the particular object subject of the drag operation in the examples described. Although not involved in the sequences described with reference to FIGS. 8A–8D and 9A–9E, a drawer region 800 is shown.

Figure 8A:
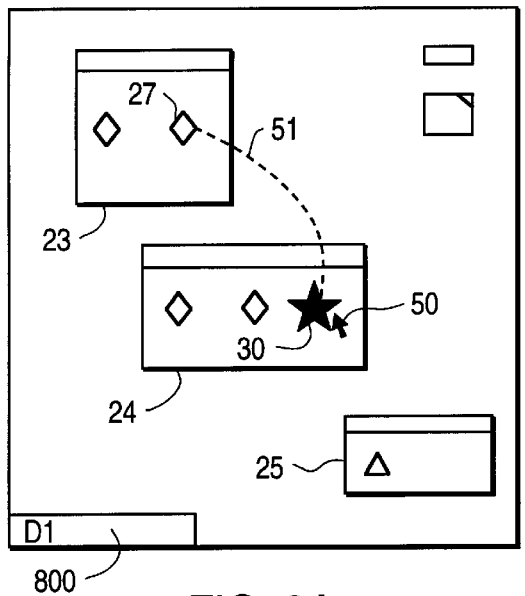
FIGS. 8A–8D illustrate a drag operation with spring loaded enclosures.
Figure 8B:
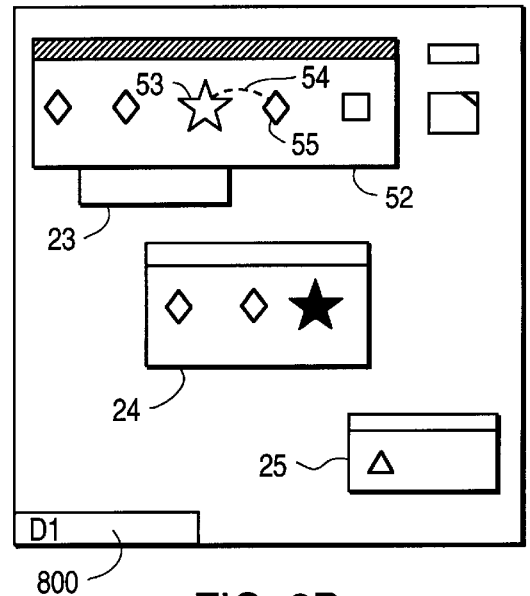
Figure 8C:
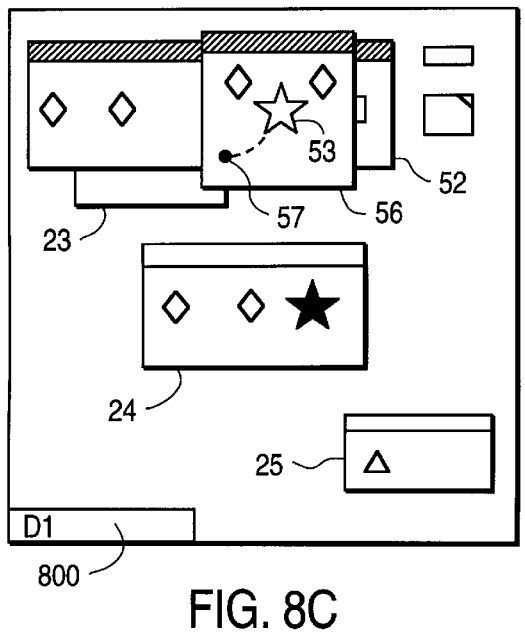
Figure 8D:
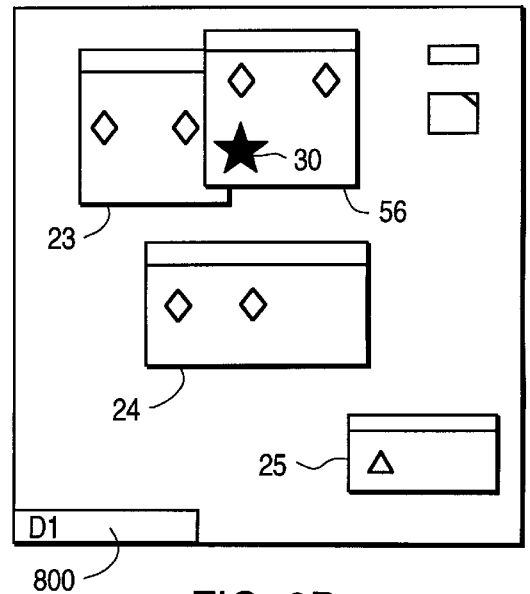

FIGS. 8A–8D illustrate a basic drag operation using spring-loaded enclosures. In FIG. 8A, the identifier 30 in window 24 is selected for a drag operation by moving the cursor 50 over the identifier 30, depressing the mouse button and dragging the cursor along a path 51 while holding the mouse button down. The user pauses the cursor over identifier 27 and causes a temporary window 52, shown in FIG. 8B, to open substantially centered over the cursor, and thus over identifier 27. Because the temporary window 52 is slightly too wide to open precisely centered over the cursor 27, it is redrawn within the desktop area as closed as possible to the preferred location centered over the cursor 27. During the drag operation, the cursor carries an altered view 53 (e.g., an outline) of the star identifier 30 and is displayed within the temporary window 52. The drag operation continues along path 54 over identifier 55 within the temporary window 52. By pausing over the identifier 55, a temporary window 56, as shown in FIG. 8C, is opened, centered over the identifier 55. The altered view 53 of the identifier and the cursor now reside within the temporary window 56. The user then completes the drag operation to point 57 by releasing the mouse button. This results in placing the identifier 30 within the temporary window 56, as shown in FIG. 8D. Also, window 52 closes on mouse up, because it is not the destination. The identifier 30 is removed from window 24 if the temporary window 56 resides on the same disk as temporary window 24. Otherwise, the identifier 30 is copied and will remain in both enclosures.

As shown in FIG. 8D, the temporary window 56 becomes a regular window on the display, as indicated by removal of the hatching across the top of the window 56. In implementations, temporary windows may be displayed in the same manner as other windows, or marked somehow as temporary. Also, at the end of the drag operation, all of the temporary windows, other than the destination window, are removed from the display. Thus, the temporary window 52 is no longer displayed within the desktop as shown in FIG. 8D.

Figure 9A:
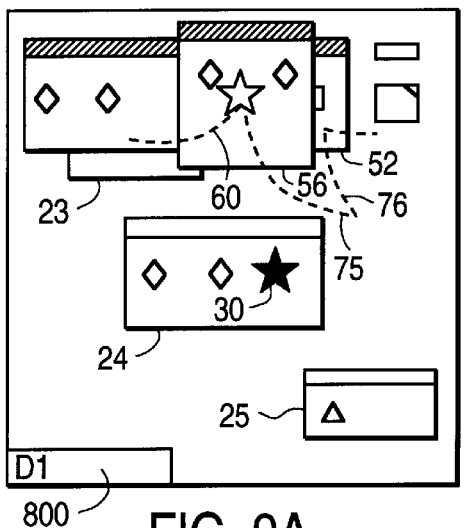
FIGS. 9A–9E illustrate alternative drag sequences using spring loaded enclosures according to the present invention.
Figure 9B:
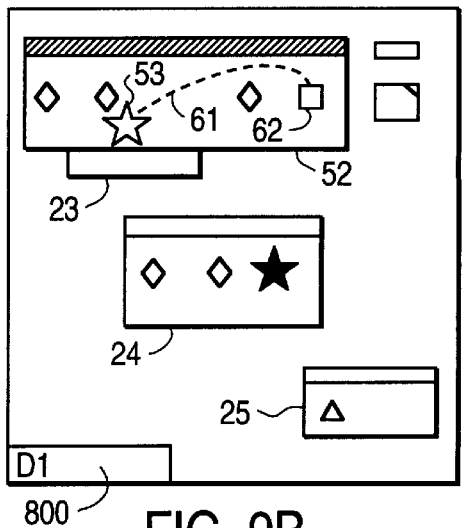

FIG. 9A illustrates the beginning of an alternative sequence, using the spring-loaded enclosure system of the present invention. FIG. 9A corresponds closely to FIG. 8C. However, in this instance, the user executes a drag operation along the path 60 which crosses the boundary of the temporary window 56 back into temporary window 52. When the boundary of temporary window 56 is crossed, the temporary window 56 is removed from the screen, as illustrated in FIG. 9B, and the altered view 53 of the identifier and the cursor reside within temporary window 52. If the user moves the cursor along path 75, rather than path 60, temporary window 56 closes, but temporary window 52 remains open. The user could close temporary window 52 by moving the cursor back into temporary window 52 and then back out along path 76.

Figure 9C:
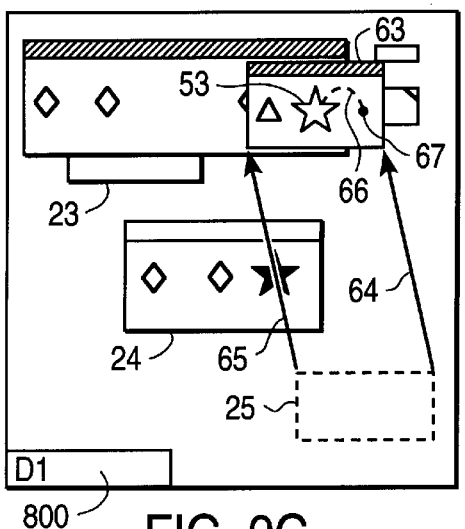

As shown in FIG. 9B, the user continues to browse by dragging along the path 61 to identifier 62. By pausing over the icon 62, temporary window 63, as illustrated in FIG. 9C, is opened, centered over the identifier 62. Also, the altered view 53 of the identifier and the cursor reside within temporary window 63.

FIG. 9C also illustrates what happens when the temporary window 63 corresponds to a window, e.g., window 25, which already existed on the desktop before the drag operation began. In this instance, the window 25 is removed from the screen. Also, a zoom operation indicated by the arrows 64 and 65 is graphically depicted on the screen to indicate to the user the movement of the window 25 to the temporary window 63. This zoom operation can take a variety of graphical characteristics difficult to show in the storyboards of FIGS. 9A–9E. However, it will be understood by those skilled in the art how this operation is accomplished.

Figure 9D:
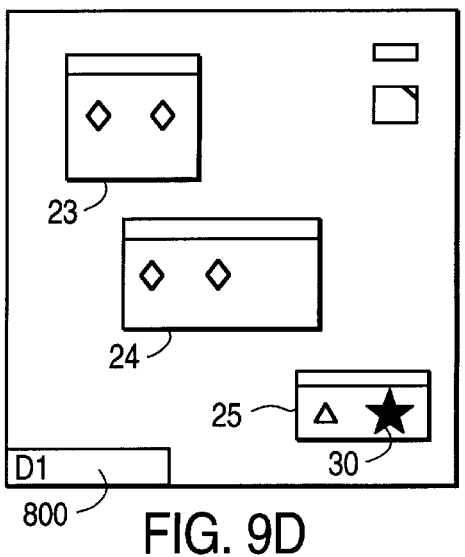
Figure 9E:
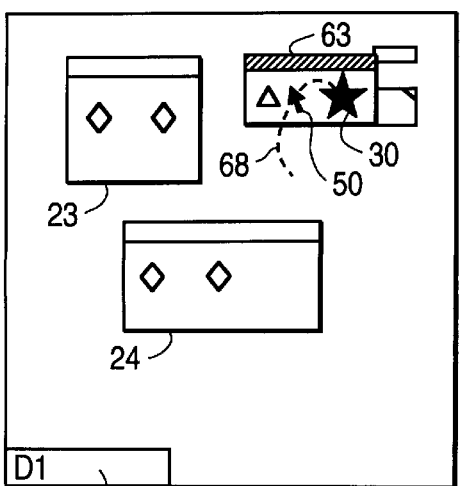

In FIG. 9C, the drag operation continues along path 66 to point 67, and the mouse button is released indicating the end of the drag operation. FIG. 9D illustrates one alternative outcome. In this case, the identifier is moved into the temporary window 63 and the temporary window is moved back to the original position of window 25. Window 25, including the identifier 30, remains on the screen. The identifier 30 has been removed from window 24 because windows 25 and 24 reside on the same disk. Alternatively, the user may have the option of keeping the temporary window 63 as the permanent window. This is illustrated in FIG. 9E. After the drag operation, the identifier 30 is left within the temporary window 63. The cursor 50 returns to its normal shape. The user has the option of closing the temporary window, which leaves the position of the real window unaffected. When the enclosure is opened again, the window will be located in its old location. If the user chooses not to close the temporary window but rather moves or resizes the temporary window before closing it, when the window is subsequently re-opened, it will be located at the new position and size.

In the illustrations of FIGS. 8A–8D and 9A–9E, temporary windows are indicated by hatching a bar across the top of the window. In a preferred system, these windows may be rendered translucent, or other effects may be used as suits the needs of a particular implementation. As mentioned above, some means of indicating a temporary window, as opposed to a regular window, may be provided within the desktop.

II. Interface Management Logic Implementation
(FIGS. 10–20)

Figure 10:
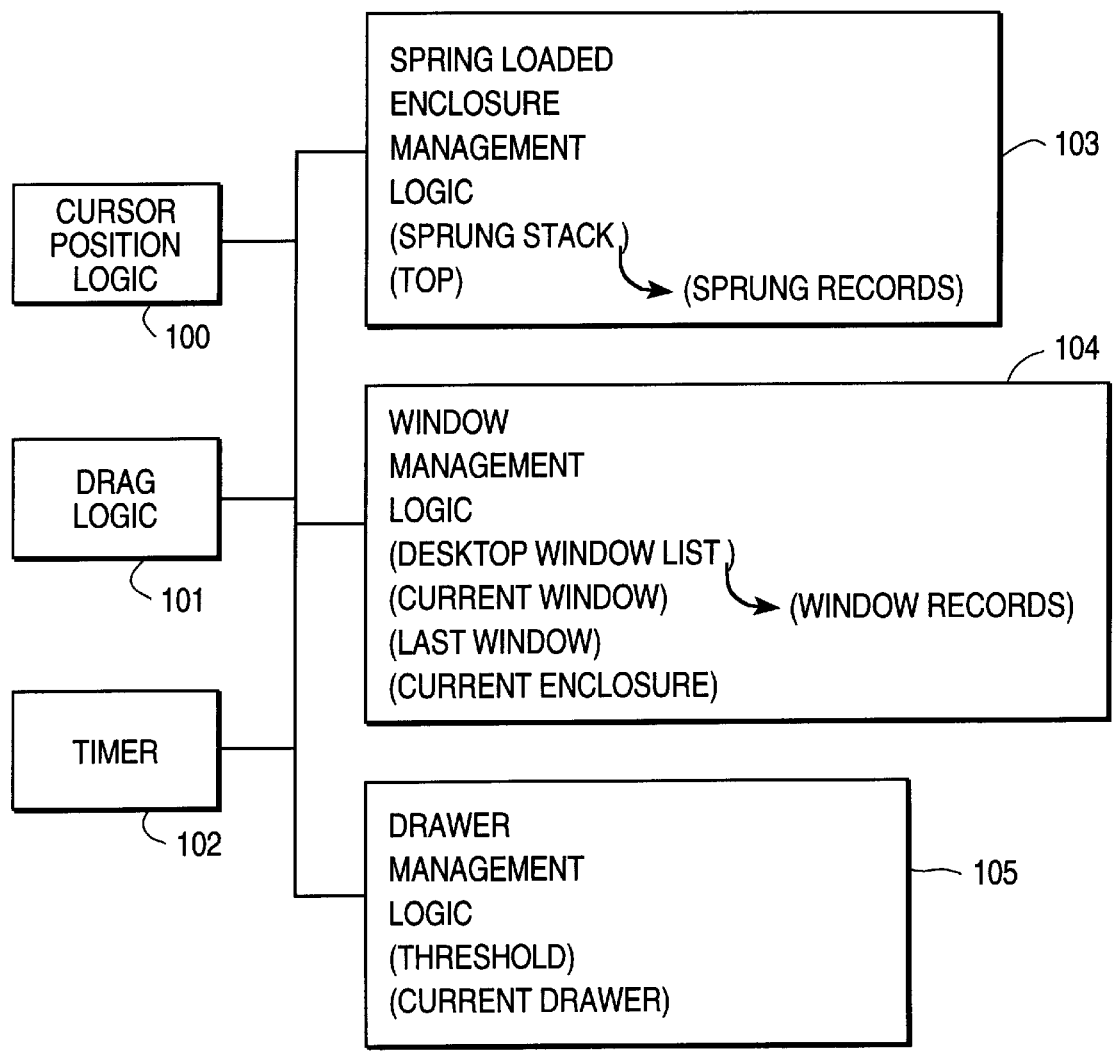
FIG. 10 is a block diagram of functional components of the user interface control system according to the present invention.
Figure 11:
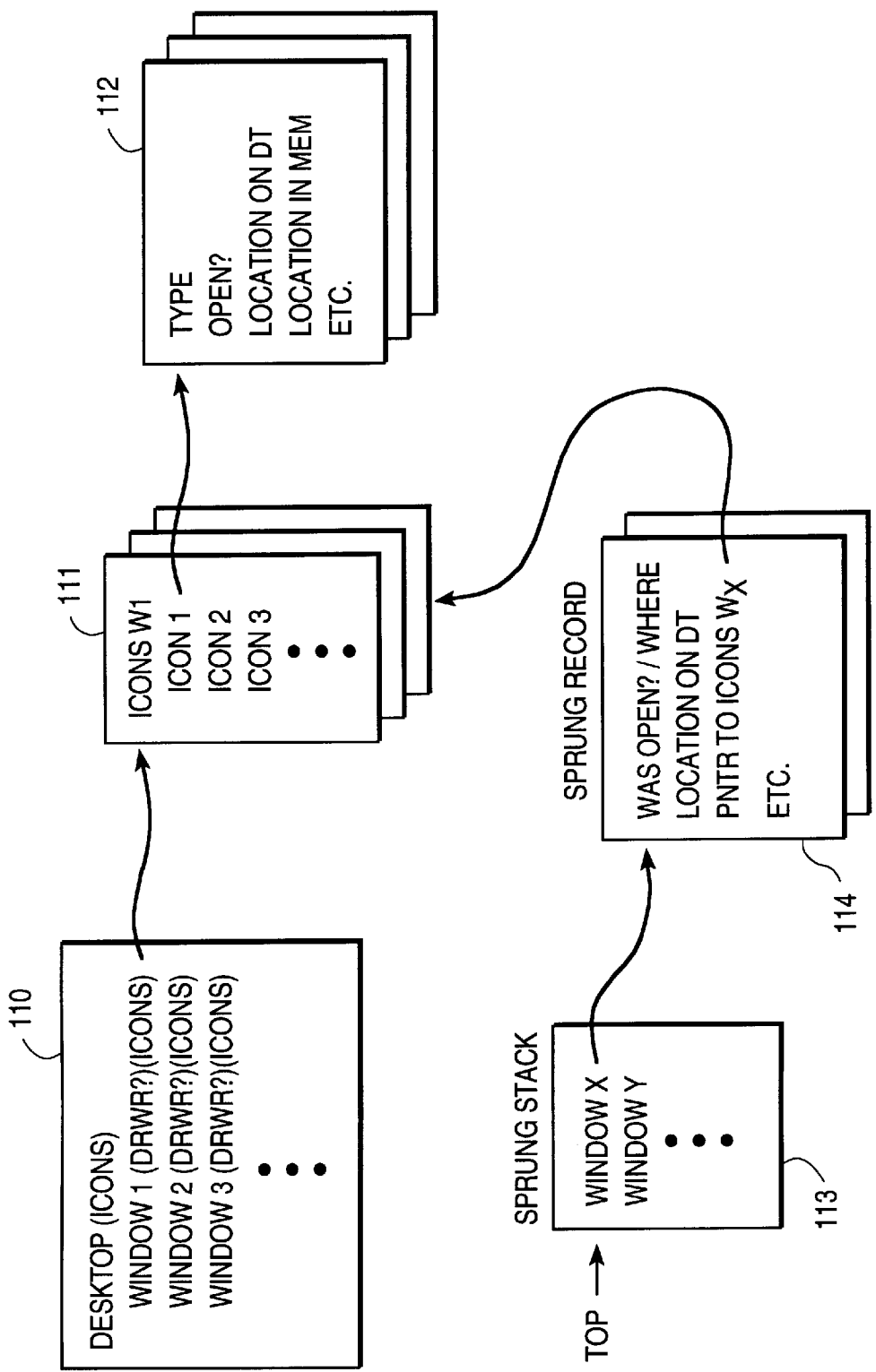
FIG. 11 is a schematic diagram of data structures used by the system of FIG. 10.

As mentioned with reference to FIG. 1, a computer system implementing the drawer management mechanism and spring-loaded enclosure mechanism according to the present invention includes control software. FIGS. 10 and 11 provide a conceptual software architecture for managing drawers and spring-loaded enclosures according to the present invention.

As shown in FIG. 10, the system includes cursor position logic 100 which maintains information concerning the current position of the cursor within the desktop area on the display. Also, drag logic 101 monitors the mouse actions including the mouse button and movement of the mouse to indicate the execution of a drag operation. Obviously with pointing devices other than a mouse, a drag operation may be indicated by a variety of user actions.

The system also includes timer logic 102 for detecting a pause of the cursor over a particular identifier in the interface management routine. Also, the timer 102 may be used for other purposes.

Also included in the control software is spring-loaded enclosure management logic 103. This management logic maintains a list of temporary windows referred to as the "Sprung Stack", and an indicator of the Top temporary window in the Sprung Stack. The Sprung Stack consists of a set of pointers to records that identify the state of the temporary windows. These records are referred to as Sprung Records.

The system further includes window management logic 104 which performs a variety of functions known to those of skill in the art for managing windows. This window management logic includes a system for opening and closing windows on the desktop in response to pointer actions, and maintains a desktop Window List. The desktop Window List comprises a list of windows that are opened on the desktop, their positions on the desktop, and other characteristics of the window, including whether the window was opened as a drawer, the location, the types of windows, and information about icons, if any, enclosed by the window. Further, enclosure windows in the list point to a window record that contains information about the enclosures that are represented by identifiers in the windows, and such other information as is needed.

In cooperation with the drag logic 101, the window management logic 104 maintains a parameter referred to as the Current Window, which indicates the window within which the cursor currently resides. Also, the window management logic 104 maintains a parameter referred to as the Last Window which indicates the last window which the cursor was over, for instance if the cursor moves from inside a window to outside a window. Finally, the window management logic maintains a record referred to as the Current Enclosure which indicates the identifier that the cursor is presently positioned over.

A final component of the control software is drawer management logic 105. The drawer management logic manages windows which are maintained on the screen with a desk drawer metaphor as described above. In particular, the windows are positioned along the periphery of the desktop. They can be slid off the desktop leaving only a drawer identifier on the perimeter of the desktop display. When the desk drawer window is opened in response to a cursor action executed by the user, the window slides onto the screen obscuring any windows underneath it. When the user is done with the window, it can be slid back offscreen to reveal the underlying windows. The desk drawer management logic 105 maintains a Threshold parameter which indicates the distance from the perimeter of the desktop within which a cursor movement will result in opening of the drawer, and a Current Drawer parameter indicating the drawer within which the cursor is currently positioned.

FIG. 11 illustrates the basic data records maintained by the spring-loaded enclosure management logic 103 and the window management logic 104. In particular, the window management logic 104 maintains a desktop window list 110. It includes an entry for the desktop with a set of pointers to a list of identifiers within the desktop. Also, each enclosure which is opened as a window within the desktop is added to the list as indicated. Thus, the list includes window 1, window 2, window 3, etc. Associated with each window, e.g., window 1, are an indicator of whether the window is a drawer and an icon pointer which points to a record of identifiers, e.g., record 111. Each identifier within window 1 is maintained in a list 111. Thus, identifier 1 includes a pointer to an enclosure record 112, which indicates the type of enclosure, whether the enclosure has been opened on the desktop, the location on the desktop of the identifier, the location in memory of the object represented by the icon, etc. If the identifier has been opened on the desktop, then information about its location will be included in the window list 110.

The spring-loaded enclosure management logic 103 maintains a Sprung Stack 113. This includes a list of temporary windows, window X, window Y, and so on, which have been opened during a drag operation according to the present invention. Each entry in the Sprung Stack points to a Sprung Record 114. The Sprung Record maintains such information about the temporary window as whether the window was previously opened on the desktop and, if so, where; the location on the desktop of the temporary window; a pointer to a list of identifiers (e.g., 111) for the temporary window; etc.

Figure 12:
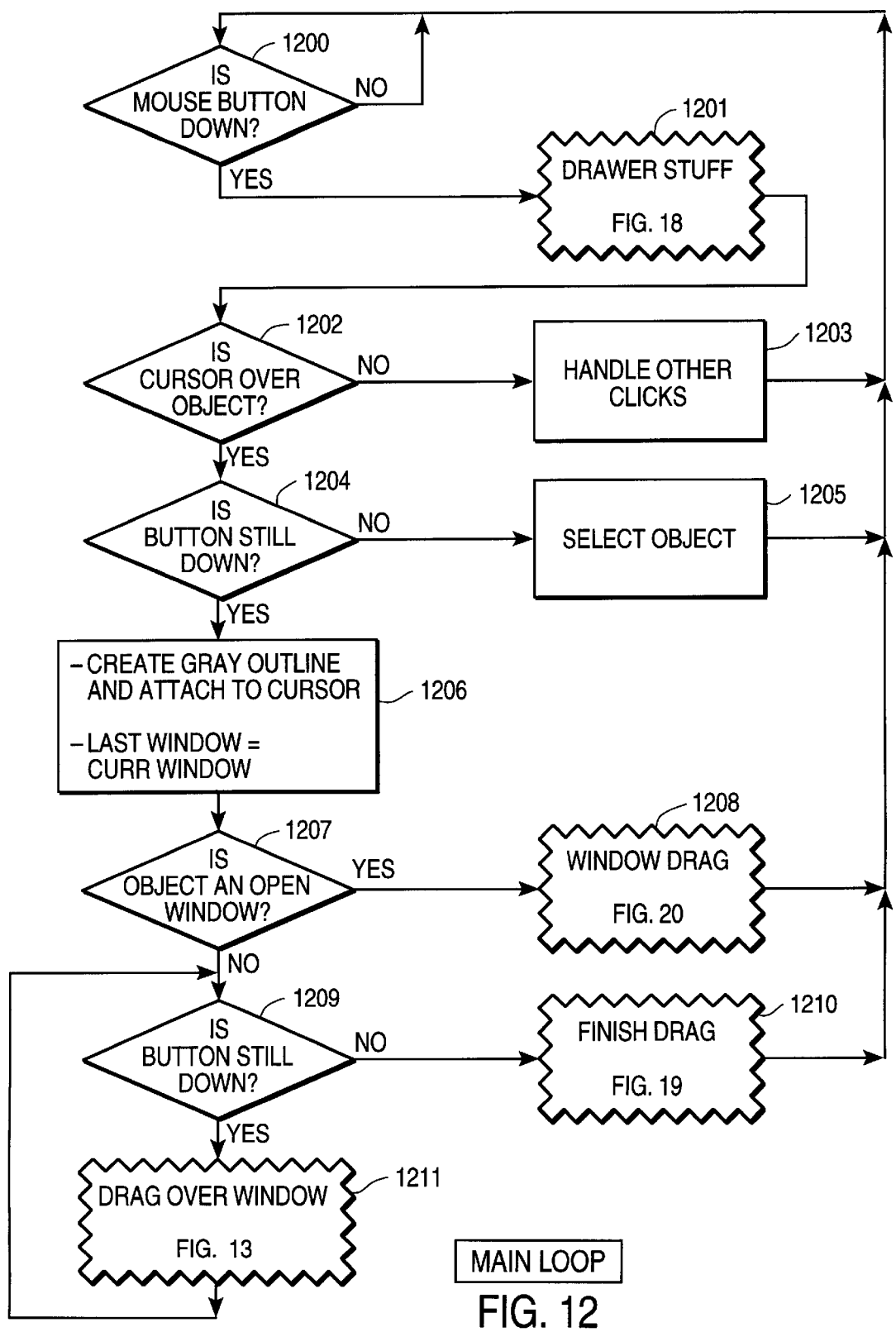
FIGS. 12–20 provide flow charts for operation of the system of FIG. 10.

A functional flow chart for executing the drawer management and spring-loaded enclosure management is provided with reference to FIGS. 12–20, in which FIG. 12 is the Main Loop. The Main Loop shown in FIG. 12 begins at block 1200 where it monitors the mouse button. If the mouse button is not down, the algorithm loops at block 1200. If the mouse button is down, then the algorithm passes through the Drawer Stuff routine which handles clicks of the mouse button in drawers represented by block 1201 which is shown in detail in FIG. 18. After the Drawer Stuff routine 1201, the algorithm tests to determine whether the cursor is over an object (block 1202). If it is not over an object, then the algorithm handles other clicks and cursor operations (block 1203) and loops to block 1200. If the cursor is over an object at block 1202, then the algorithm monitors the mouse button (block 1204). If the mouse button does not remain down, then a Select Object routine is executed, as indicated at block 1205, and the algorithm loops to block 1200. The select object routine 1205 may result in a variety of operations as known in the art, such as opening an application window.

If the mouse button remains down at block 1204, then a drag operation is indicated. In this case, the routine creates a grey outline (referred to as an "altered view" above) of the object and attaches the grey outline to the cursor. Also, the Last Window parameter is set equal to the Current Window parameter (block 1206).

Figure 20:
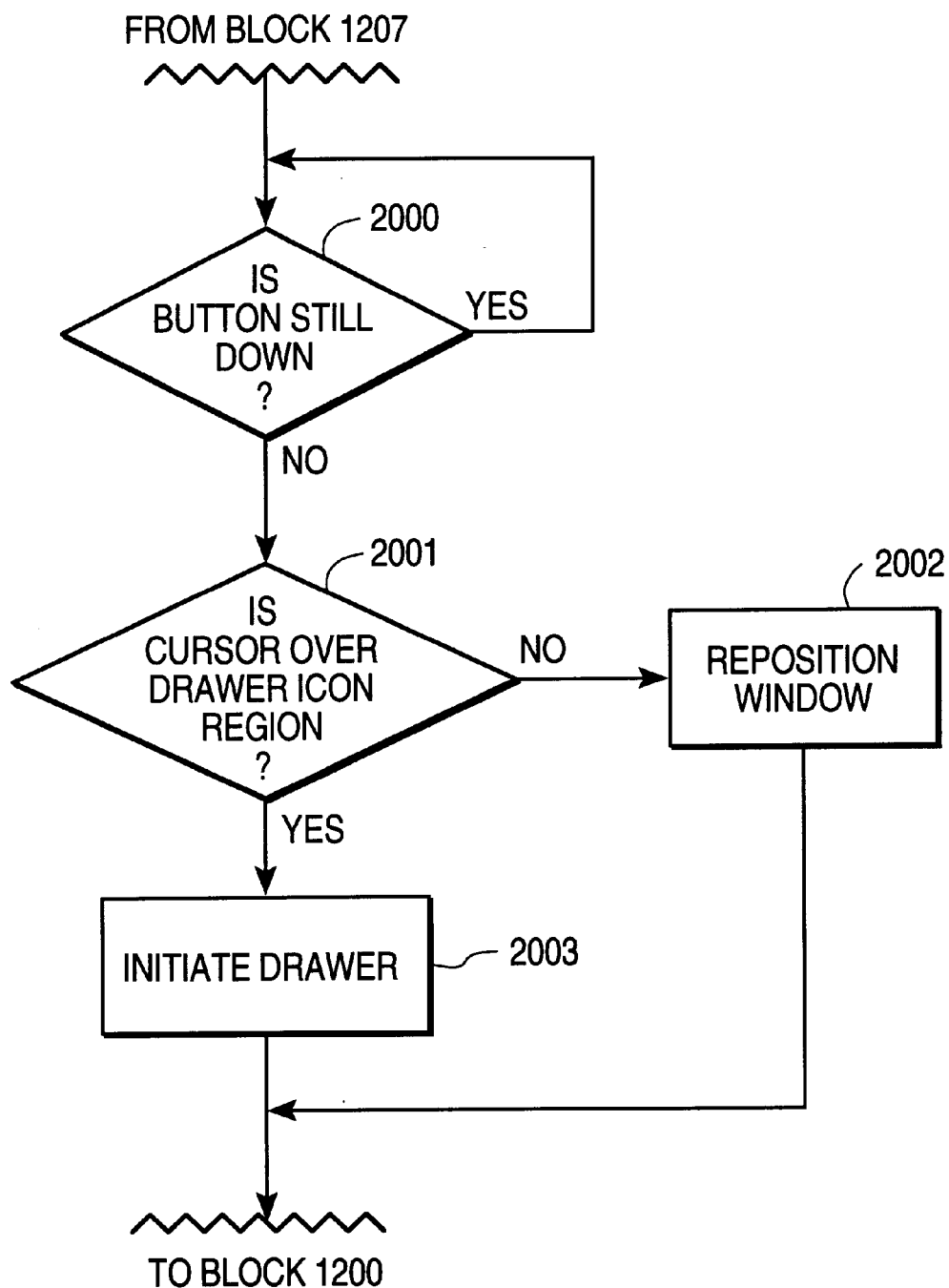

After block 1206, the algorithm tests whether the object subject of the drag is an open window (block 1207). If it is an open window, then the Window Drag routine represented by block 1208, and shown in detail in FIG. 20 is executed. After the Window Drag routine, the algorithm loops back to block 1200.

If the object was not an open window at block 1207, then the algorithm loops to block 1209, where the mouse button is monitored (block 1209). If the mouse button is released, then the algorithm branches to the Finish Drag routine represented by block 1210 which is shown in detail in FIG. 19. If the mouse button remains down, then the algorithm proceeds through the Drag Over Window routine represented by block 1211 shown in FIG. 13. After the Drag Over Window routine at block 1211, the algorithm loops to block 1209 to monitor the drag operation.

Figure 13:
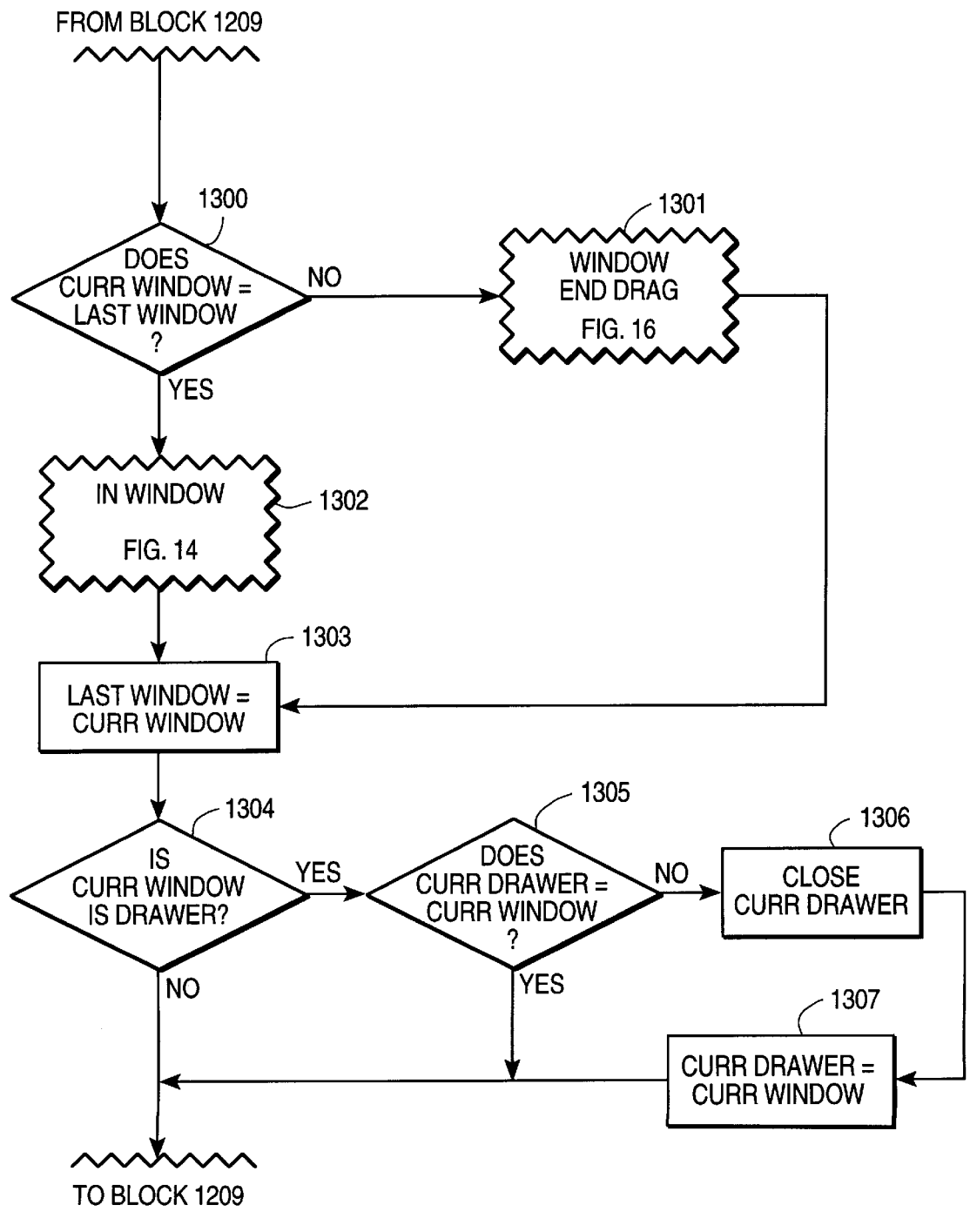

FIG. 13 illustrates the Drag Over Window routine represented by block 1211 in FIG. 12. The Drag Over Window routine is started from block 1209. First, it tests whether the Current Window parameter is equal to the Last Window parameter (block 1300). If it is not equal, the border of the last window has been crossed and the algorithm branches to the Window End Drag routine represented by block 1301 which is shown in detail in FIG. 16. If the Current Window remains equal to the Last Window (the cursor remains within the boundary of the window), then the algorithm branches to the In Window routine represented by block 1302, as shown in detail in FIG. 14. From the Window End Drag routine of block 1301, and the In Window routine of block 1302, the algorithm proceeds through block 1303 where Last Window is again set to Current Window. Next, the algorithm tests whether the Current Window is a drawer (block 1304). If it is not a drawer, then the routine returns to block 1207 of FIG. 12. If the Current Window is a drawer, then the algorithm tests whether the Current Drawer is equal to the Current Window (block 1305). If not, then the cursor has moved out of the Current Drawer, and the Current Drawer is moved offscreen (block 1306). The Current Drawer parameter is set to the Current Window in block 1307 and the algorithm loops back to block 1209 of FIG. 12. If, in block 1305, the Current Window is not a drawer, the algorithm returns to block 1209 of FIG. 12.

Figure 14:
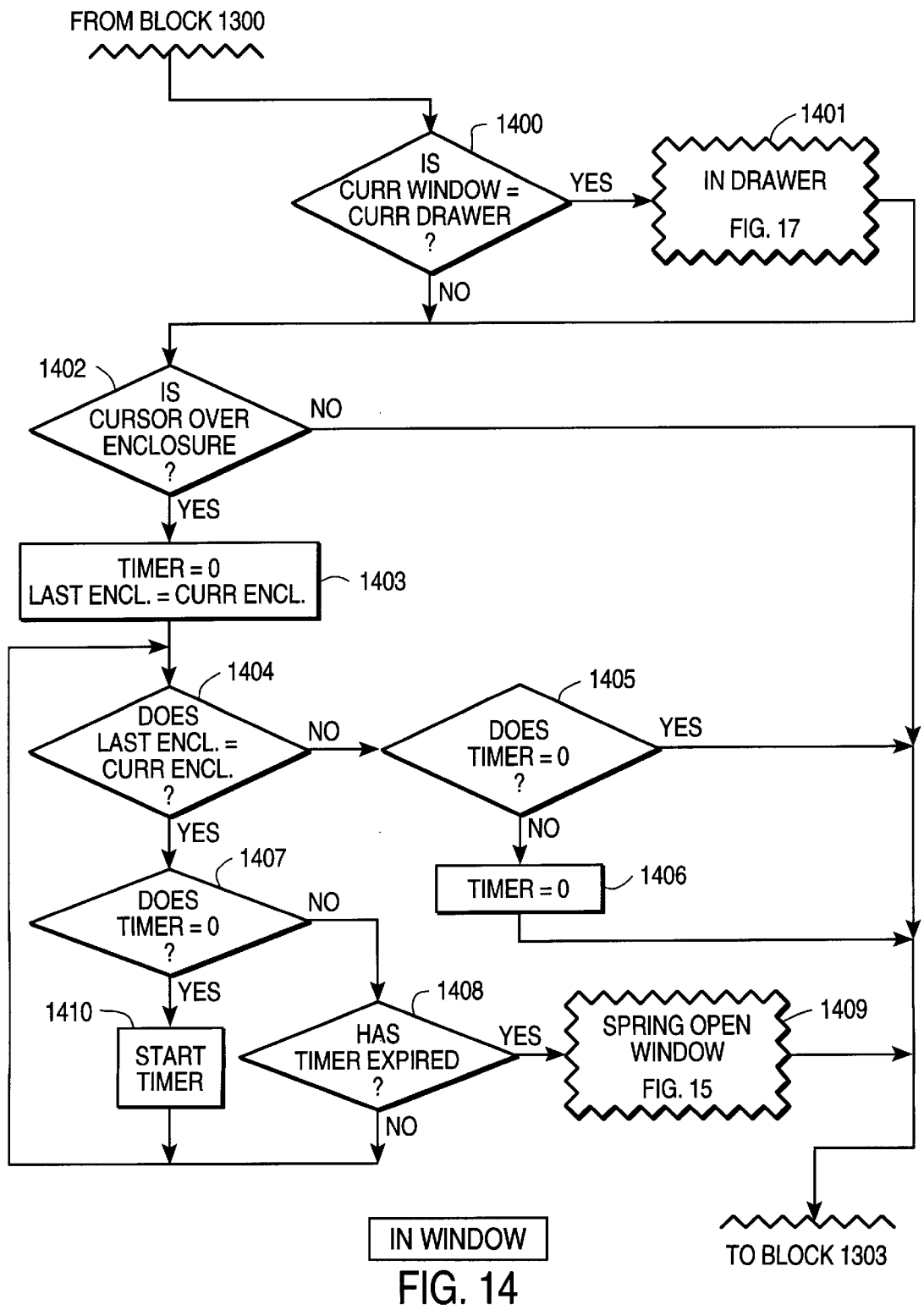
Figure 17:
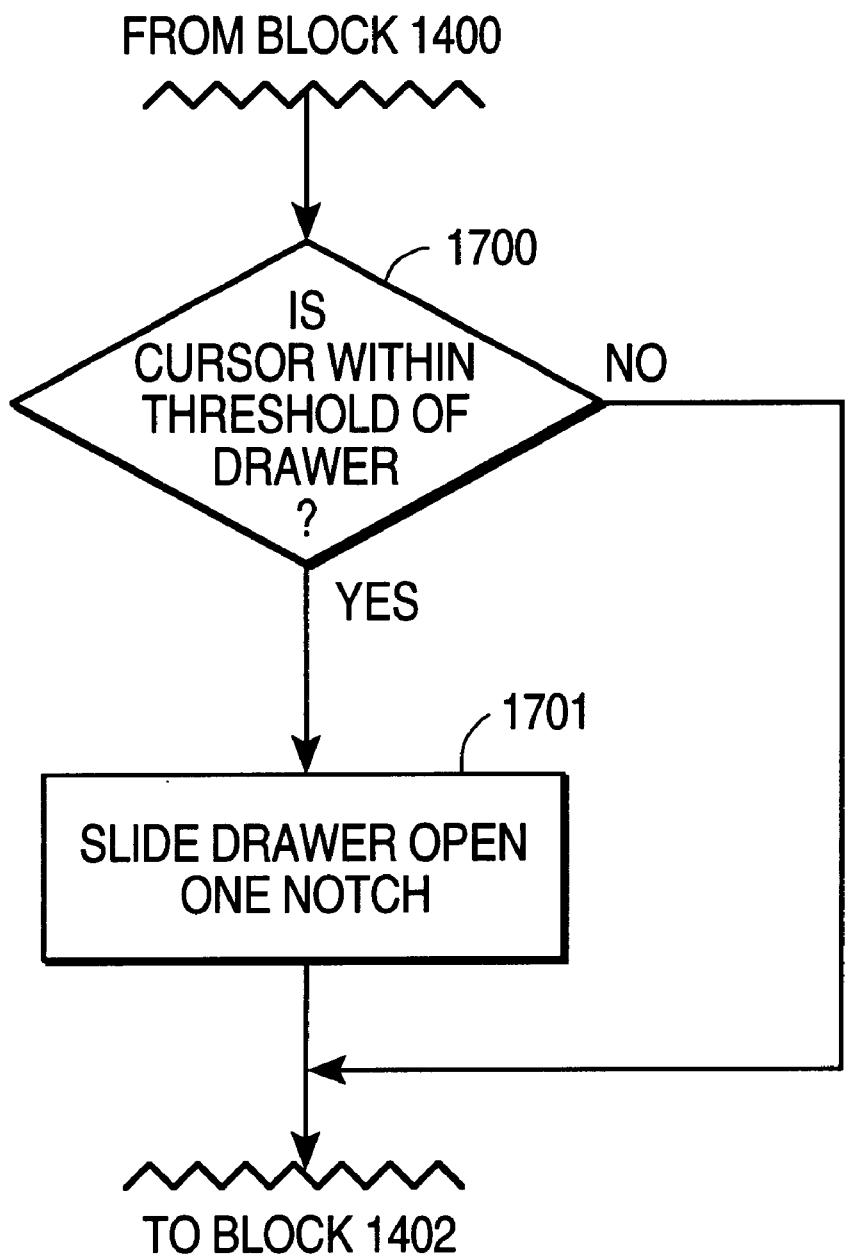

FIG. 14 illustrates the In Window routine represented by block 1302 of FIG. 13. The In Window routine is entered from block 1300 of FIG. 13. First, the algorithm tests whether the Current Window is equal to Current Drawer (block 1400). If it is the Current Drawer, then the In Drawer routine represented by block 1401 and shown in detail in FIG. 17 is executed. If the Current Window is not equal to the Current Drawer in block 1400, and from the output of the In Drawer routine in block 1401, the algorithm branches to block 1402, where the algorithm determines whether the cursor is over an enclosure icon. If it is not over an enclosure icon, then the algorithm returns to block 1303 of FIG. 13. Otherwise, the algorithm branches to block 1403, where a timer is set to zero, and the Last Enclosure parameter is set equal to the Current Enclosure. Next, the algorithm monitors whether the cursor remains over the Current Enclosure by testing whether the Last Enclosure remains equal to the Current Enclosure in block 1404. If it does not remain over the Current Enclosure, then the timer is tested (block 1405). If the timer is equal to zero, then the algorithm branches to block 1303 of FIG. 13. If it is not equal to zero, the timer is first reset to zero in block 1406 and then returns to block 1303 of FIG. 13.

Figure 15:
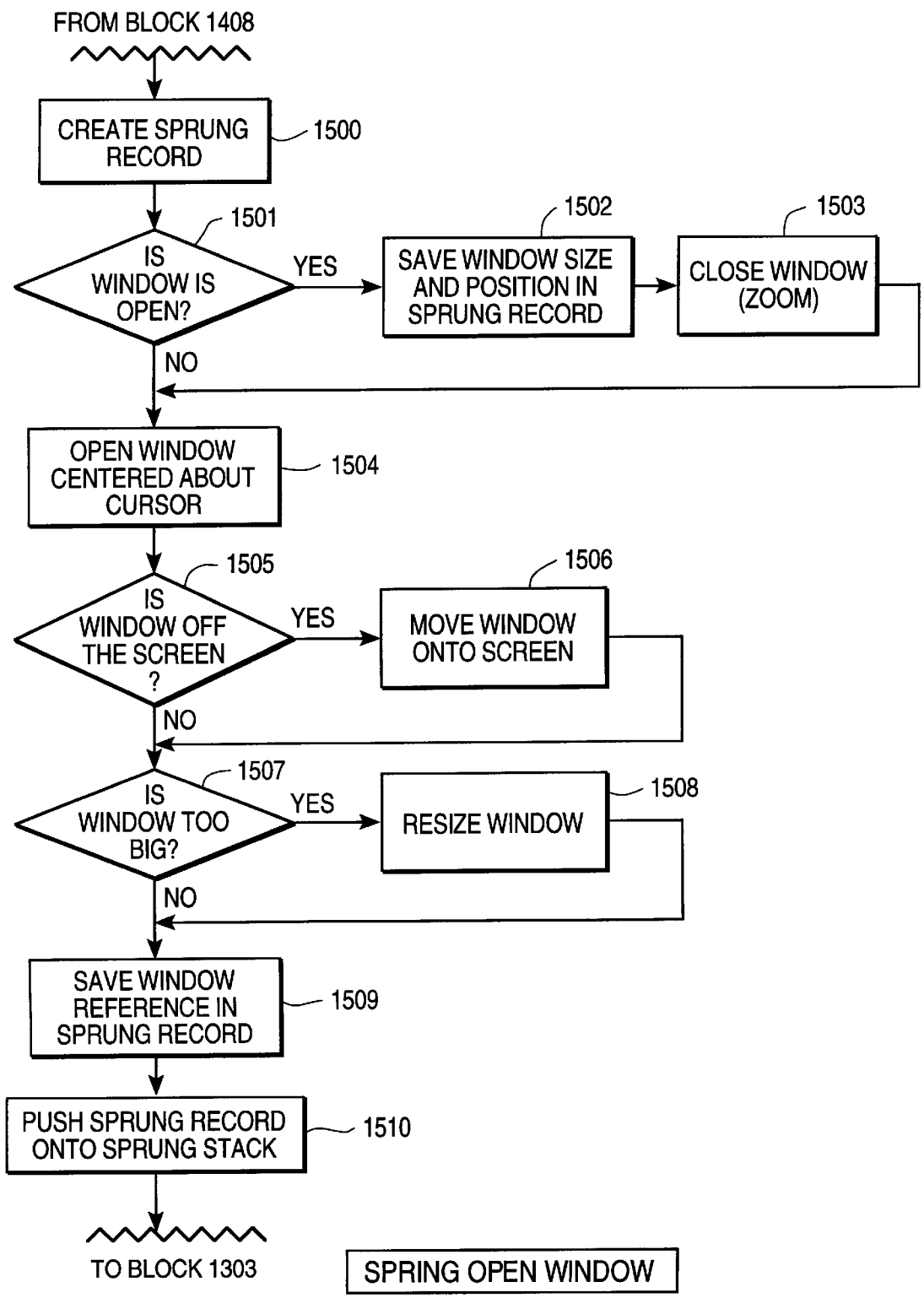

If, in block 1404, the cursor remains over the Current Enclosure, the algorithm tests whether the timer is equal to zero in block 1407. If the timer is not equal to zero, the algorithm tests whether the timer has expired in block 1408. If it has expired, then the Spring Open Window routine represented by block 1409 and shown in detail in FIG. 15 is executed. After the Spring Open Window routine in block 1409, the algorithm returns to block 1303 of FIG. 13.

If in block 1407 the timer was equal to zero, then the timer is started (block 1410) and the algorithm loops to block 1404 to begin monitoring whether the cursor remains over the enclosure until expiration of the timer.

FIG. 15 illustrates the Spring Open Window routine corresponding to block 1409 of FIG. 14. The algorithm is entered from block 1408 of FIG. 14. The first step is to create the Sprung Record for the particular window being sprung open (block 1500). Next, the algorithm determines whether the window being sprung open is already open on the desktop (block 1501). If it is already open, then the existing window size and position are saved in the Sprung Record (block 1502). Next, the existing window is removed from the screen (block 1503). Coupled with removing the existing window, a zoom operation may be executed to graphically illustrate movement of the window being closed to the new position.

If the window to be sprung open was not already open at block 1501, or after block 1503, the algorithm opens a temporary window centered about the cursor position (block 1504). Next, the temporary window centered about the cursor position is tested to determine whether it is partially offscreen (block 1505). If it is partially offscreen, then the window is moved onto the screen (block 1506). After block 1506, or if the window is completely on the screen at block 1505, then the algorithm tests whether the window is too big for the sprung open routine (block 1507). If the window is too big, then it is re-sized (block 1508). If the window is too big, then it is resized to fit on the monitor that the cursor is currently on, leaving several pixels of free space around the window.

After block 1507, if the window is not too big, or after it is resized in block 1508, the algorithm loops to block 1509 where the window reference (description of the temporary window) is stored in the Sprung Record. Next, the Sprung Record is pushed onto the Sprung Stack (block 1510). After block 1510, the algorithm returns to block 1303 of FIG. 13.

Figure 16:
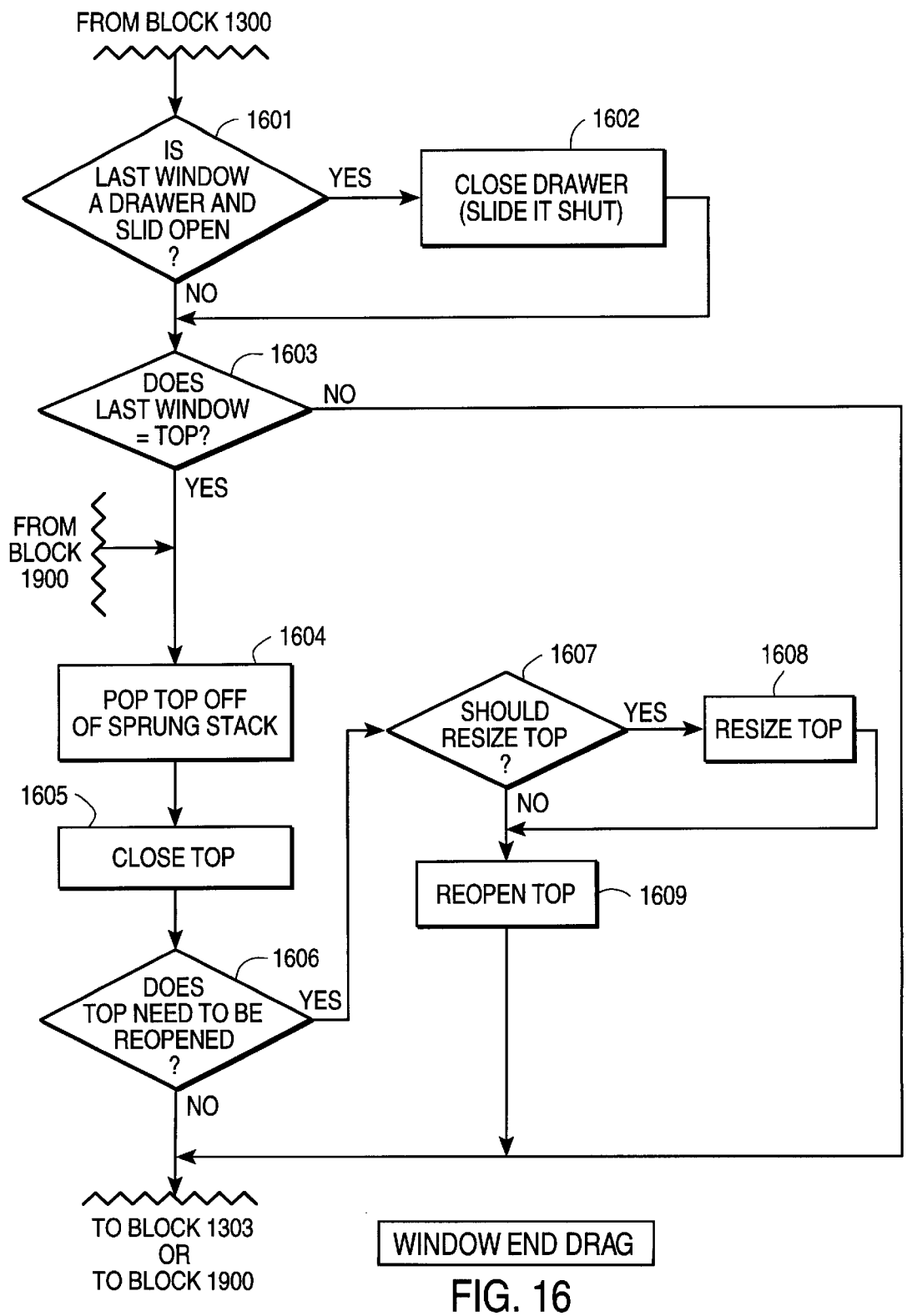

FIG. 16 illustrates the Window End Drag routine represented by block 1301 of FIG. 13. The Window End Drag routine is entered from block 1300 of FIG. 13. The first step is to determine whether the Last Window is a slid open drawer in block 1601. If it is a slid open drawer, then the drawer is moved offscreen (block 1602).

If the Last Window is not an open drawer, or after the drawer is shut in block 1602, then the algorithm tests whether the Last Window is the Top Window in the Sprung Stack (block 1603). If it is not, then the algorithm returns to block 1303 of FIG. 13 or to block 1900 of FIG. 19.

Figure 19:
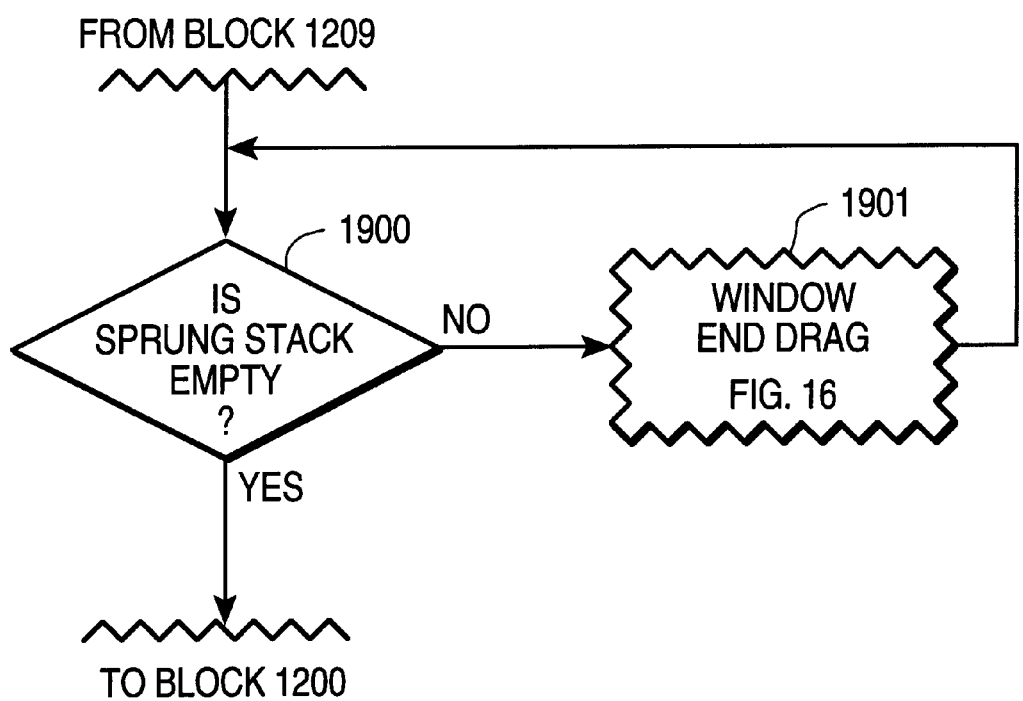

If at block 1603 the Last Window is the Top window in the sprung stack or if the algorithm is entered from block 1901 of FIG. 19, then the Last Window is popped off the Top of the Sprung Stack (block 1604).

After the Sprung Record is popped off of the Top of the Sprung Stack, the temporary window corresponding to the Top record is closed (block 1605). Next, the algorithm determines whether the Top window (being popped off the stack) needs to be re-opened (block 1606). This occurs if the Top was open at another location on the desktop before the temporary window was opened during the drag operation. If so, the Top is re-opened at the location indicated in the Sprung Record, and then the algorithm determines whether it should be resized (block 1607). If it needs to be resized, then the resize operation is executed (block 1608). If the Top that is being popped off the top of the Sprung Stack does not need to be resized, or after the resizing in block 1608, then the new Top of the Sprung Stack is opened (block 1609). After block 1609, or if the window does not need to be re-opened from block 1606, the algorithm returns to block 1303 of FIG. 13 or to block 1900 of FIG. 19.

FIG. 17 illustrates the In Drawer routine corresponding to block 1401 of FIG. 14. The In Drawer routine in entered from block 1400 of FIG. 14 and first tests whether the cursor is within the Threshold of the drawer management logic (block 1700). If it is not, then the algorithm returns to block 1402 of FIG. 14. If it is within the Threshold, then the drawer is slid onscreen one notch (block 1701). After block 1701, the algorithm returns to block 1402 of FIG. 14. By keeping the cursor in this position, the user causes the drawer to gradually slide onscreen.

Figure 18:
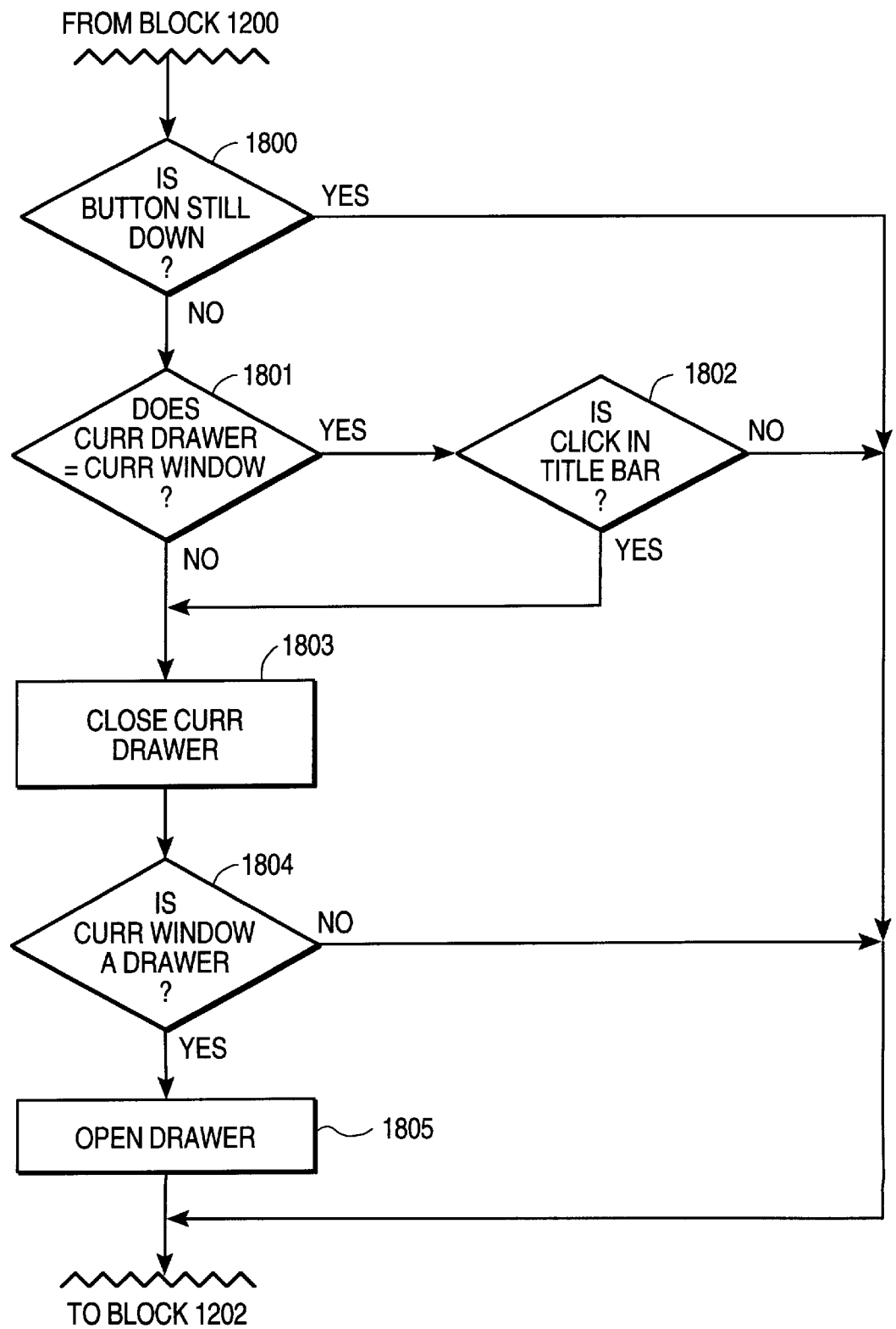

FIG. 18 illustrates the Drawer Stuff routine entered from block 1200 of FIG. 12. It first tests whether the button remains down (block 1800). If it is down, then the algorithm returns to block 1202 of FIG. 12. If the button has been released, the algorithm tests whether the Current Drawer is equal to the Current Window (block 1801). If the Current Drawer is equal to the Current Window in block 1801, the algorithm determines whether the click (release detected in block 1800) occurred in the title bar of the onscreen drawer (block 1802). If not, the algorithm returns to block 1202 of FIG. 12. If the click was in the title bar, or if the click was not in the Current Drawer as indicated at block 1801, then the Current Drawer is removed from the screen (block 1803). Next, the algorithm determines whether the Current Window is a drawer at all (block 1804). If not, it returns to block 1202. If the Current Window is a drawer, then the drawer is moved onscreen (block 1805). This occurs when a drawer is open and another drawer is clicked.

FIG. 19 illustrates the Finish Drag routine corresponding to block 1208 of FIG. 12. The Finish Drag routine is entered from block 1207 of FIG. 12. The algorithm first determines whether the Sprung Stack is empty in block 1900. If it is not empty, then the Window End Drag routine is executed as indicated at block 1901. The Window End Drag routine of block 1901 enters the routine of FIG. 16 at block 1604. After the Window End Drag routine of block 1901, the algorithm returns to block 1900. If the Sprung Stack was empty at block 1900, then the algorithm returns to block 1200 of FIG. 12.

FIG. 20 illustrates the Window Drag routine which is represented by block 1208 in FIG. 12. The Window Drag routine is called from block 1207 in FIG. 12. At first, the algorithm monitors whether the mouse button remains down (block 2000). If it does remain down, then the drag operation is continuing. When the mouse button is released, the algorithm loops to block 2001, where the algorithm tests whether the cursor is over the drawer icon region. If it is not over the drawer icon region, then the window is repositioned within the desktop area (block 2002). If, in block 2001, the cursor was over a drawer icon region, then an initiate drawer routine is executed (block 2003). This results in marking the window as a drawer in the window list, and setting up the drawer identifier icon. Finally, the algorithm returns from the reposition window block 2002 or from the initiate drawer block 2003 to block 1200 of FIG. 12.

III. Alternate Spring Open Gestures
(FIGS. 21A–B and 22A–B)

FIGS. 21A–B and 22A–B illustrate alternative mouse gestures that may be used for springing open enclosures according to the present invention. The preferred system, as illustrated above, springs open enclosures in response to a pause of the cursor over the enclosure to be opened, as described with reference to FIG. 14. Alternative systems may be implemented that spring open enclosures based on other pointer gestures. Two examples are shown in FIGS. 21A–B and FIGS. 22A–B.

Figure 21A:
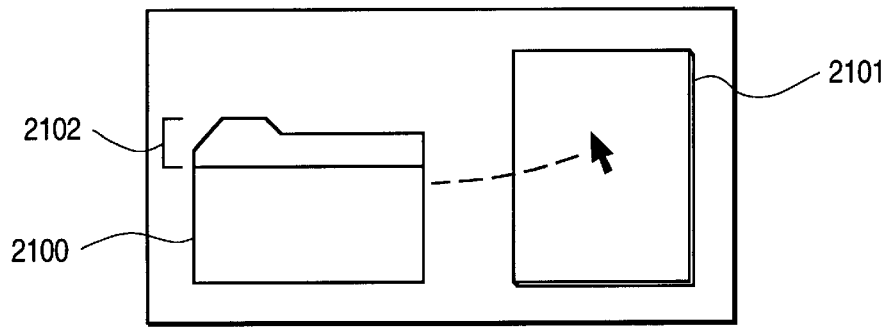
FIGS. 21A and 21B illustrate an alternative technique for indicating a wish to open a spring loaded enclosure.
Figure 21B:
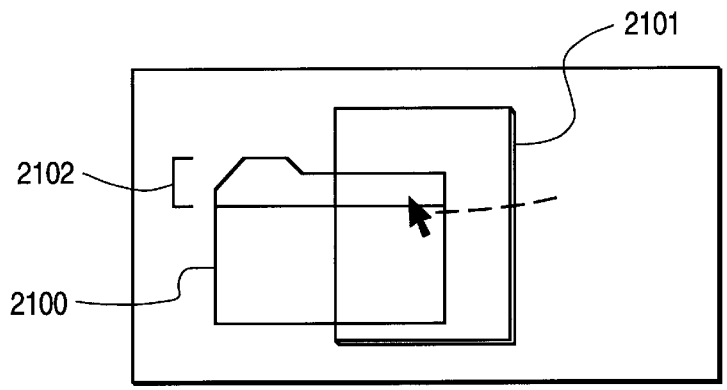

In FIGS. 21A–B, enclosure identifier 2100 and a dragged icon 2101 are shown. The enclosure identifier 2100 has a hot region, or temporary window open region, 2102. If the cursor is moved into the hot region 2102, as illustrated in FIG. 21B, then the sprung open enclosure will be open. If the cursor does not hit the hot region 2102, then no action occurs.

Figures 22A, 22B:
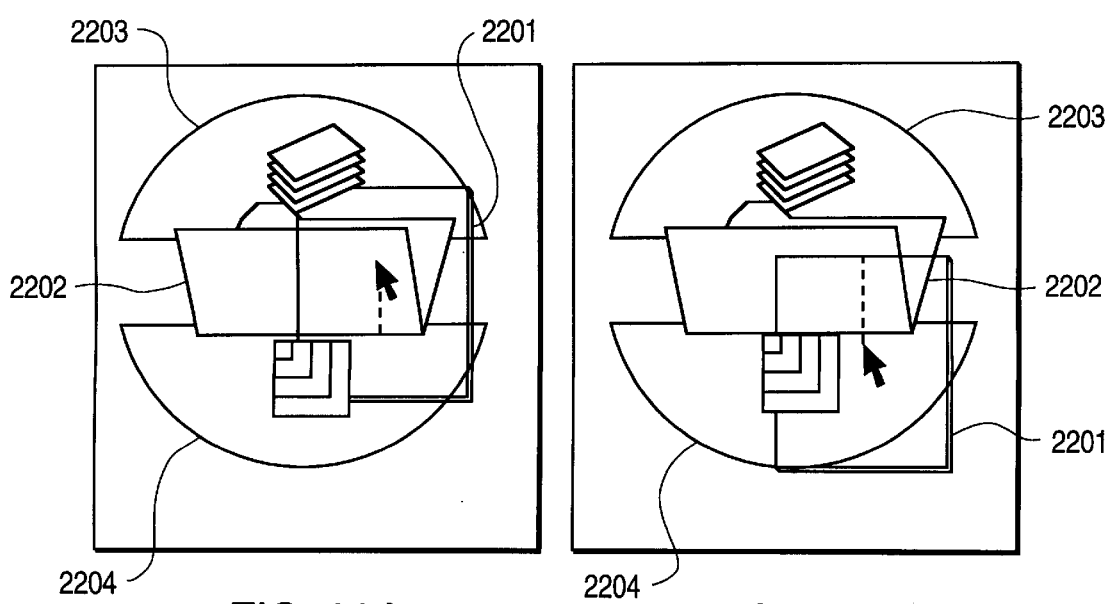
FIGS. 22A and 22B illustrate another alternative technique for indicating a wish to open a spring loaded enclosure.

In FIGS. 22A and 22B, another alternative sequence is shown. In this sequence, a dragged identifier 2201 is dragged over a folder. When this occurs, a select graphic appears, such as an opened folder icon 2202 with a split pie symbol. The split pie has a first side 2203 and a second side 2204. If the user moves the cursor downward to the second side 2204, as illustrated in FIG. 22B, then the sprung open enclosure is opened. Alternatively, if the user moves the cursor upward into the first side 2203, then the select graphic is removed and the original identifier reappears.

Those skilled in the art will appreciate that there are a variety of techniques for indicating the desire to spring open an enclosure during a drag operation.

IV. Conclusion

In sum, a new way to view an opened window is provided based on the pop-up or desk drawer metaphor.

The drawer behavior allows a user to have quick access to areas of windows that are located offscreen. Importantly, any window that is partially located offscreen may receive this behavior. Significantly, all a user needs to do to add this behavior to a window is drag the window off the edge of the screen. There are two mechanisms for bringing the hidden areas temporarily back into the screen. First, the user may make some indication perhaps by a click or double click on the window title bar, or a click in a special control region of the title bar, or by just mousing into the drawer region, which will temporarily slide or begin to slide the window into view on the screen. When the user clicks on another window, the pointer exits the window, or some other gesture is made by the user, the window will slide shut—that is, it will slide back off the screen to its original state. Second, the user may slide the window open while dragging an object around, by mousing into the onscreen portion of the window and touching at the intersection of the screen boundary and the window, or by making some other gesture. As long as the pointer is held in this state, the window will slide onscreen gradually a few lines at a time. When the pointer exits the window, the window slides back shut to its original position.

This pop-up or slide onscreen behavior can be applied to any window, including applications windows, control panel windows, tool palette windows, enclosure windows, and the like. This capability for windows greatly advances over prior art systems.

Furthermore, this drawer behavior can be combined with spring loaded enclosures described above, to greatly enhance the user's ability to browse during a drag operation through the entire storage system hierarchy in the computer system.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for organizing a graphic workspace on a computer including a display having a graphic workspace, comprising:

memory to store a plurality of objects including enclosures in the memory, wherein enclosures comprise objects which occupy a window on the display when opened and may enclose other objects;

first window management logic, coupled with the display, that manages and displays a plurality of opened windows within a window region of the graphic workspace, wherein windows in the plurality of windows may overlap and obscure other windows in the plurality windows within the window region;

second window management logic, coupled with the display and the first window management logic, that provides a control region within the graphic workspace, and an identifier within the control region corresponding to a particular opened window comprising enclosures, and is responsive to user input indicating selection of the identifier within the control region for moving the particular opened window into the window region; and logic that removes the particular window from the window region in response to selection of an enclosure within the particular window.

2. The apparatus of claim 1, wherein the second window management logic includes logic that graphically positions the particular window into the window region as if from outside the window region.

3. The apparatus of claim 1, wherein the second window management logic includes logic that removes the particular window from the window region, in response to user input.

4. The apparatus of claim 3, wherein the second window management logic includes logic that graphically positions the particular window out of the window region as if to outside the window region when removing the particular window from the window region.

5. The apparatus of claim 1, wherein the computer includes a pointing device by which a user positions a cursor within the window region and the control region, and with which the user provides the user input indicating selection of the identifier within the control region.

6. The apparatus of claim 5, wherein the second window management logic includes:

an input that receives an input signal to indicate a drag operation of a window in the graphic workspace; and logic, coupled with the pointing device and the first window management logic, that initiates an identifier within the control region for a first particular opened window in response to a drag operation of the first particular window to the control region.

7. The apparatus of claim 5, further including:

logic, coupled to the display and the pointing device, responsive to a drag operation of a particular object over an identifier within the control region corresponding to the particular window to position the particular window into the window region in cooperation with the drag operation.

8. The apparatus of claim 1, wherein the plurality of windows includes application windows providing area within the window region for application programs and enclosure windows providing area within the window region for displaying identifiers corresponding to related objects.

9. The apparatus of claim 1, wherein the particular opened window subject of the second windows management logic comprises an application window.

10. The apparatus of claim 1, wherein the particular opened window subject of the second window management logic comprises an enclosure enclosing other objects.

11. The apparatus of claim 1, wherein the plurality of windows includes control panel windows providing area within the window region for system control functions, and the particular opened window subject of the second window management logic comprises a control panel window.

12. The apparatus of claim 1, wherein the plurality of windows includes tool palette windows providing area within the window region for tool functions for related applications, and the particular opened window subject of the second window management logic comprises a tool palette window.

13. An apparatus for organizing a graphic workspace on a computer including a display having a graphic workspace, and a pointing device by which a user positions a cursor on the display, comprising:

memory to store a plurality of objects including enclosures in the memory, wherein enclosures comprise objects which occupy a window on the display when opened and may enclose other objects;

first window management logic, coupled with the display, that manages a plurality of windows within a window region having a perimeter in the graphic workspace on the display corresponding to opened objects, wherein the plurality of windows includes application windows providing area within the window region for application programs and enclosure windows providing area within the window region to display identifiers corresponding to related objects;

second window management logic, coupled with the display and the first window management logic, that provides a control region near the perimeter of the window region and an identifier within the control region corresponding to a particular opened window, and that moves the particular opened window into the window region, in response to user gestures of the pointing device indicating selection of the identifier; and logic that removes the particular window from the window region in response to selection of an enclosure within the particular window.

14. The apparatus of claim 13, wherein the plurality of windows includes control panel windows providing area within the window region for system control functions, and the particular window subject of the second window management logic comprises a control panel window.

15. The apparatus of claim 13, wherein the plurality of windows includes tool palette windows providing area within the window region for tool functions for related applications, and the particular window subject of the second window management logic comprises a tool palette window.

16. the apparatus of claim 13, wherein the second window management logic includes logic that graphically positions the particular window into the window region as if from outside the perimeter of the window region when opening the particular window.

17. The apparatus of claim 13, wherein the second window management logic includes logic that graphically positions the particular window out of the window region as if to outside the perimeter of the window region when removing the particular window from the window region.

18. The apparatus of claim 13, wherein the second window management logic includes:

an input that receives an input signal to indicate a drag operation of a window in the graphic workspace the drag operation comprising associating the window with the cursor; and logic, coupled with the pointing device and the first window management logic, that initiates an identifier within the control region for a particular window in response to a drag operation of the particular window to the control region.

19. The apparatus of claim 13, further including:

logic, coupled to the display ad the pointing device, responsive to a drag operation of a particular object over an identifier within the control region corresponding to a particular window, that positions the particular window into the window region in cooperation with the drag operation.

20. The apparatus of claim 13, further including:

logic, coupled to the display and the pointing device, responsive to a drag operation of the pointer over an identifier within the control region corresponding to the particular window that positions the particular window into the window region in cooperation with the drag operation.

21. The apparatus of claim 13, wherein the particular opened window comprises an enclosure window, and further including:

an input that receives an input signal to indicate a drag operation of an object in the graphic workspace;

logic, coupled to the display and the pointing device, responsive to a drag operation of a particular object over an identifier within the control region corresponding to the particular opened window, that slides the particular opened window into the window region in cooperation with the drag operation to display icons corresponding to objects enclosed by the particular opened window; and logic, coupled to the display and the pointing device, responsive to a drag during the drag operation of the particular object over a particular icon within the particular opened window, that opens a temporary window within the window region for the object corresponding to the particular icon.

* * * * *